US012331576B2

(12) United States Patent
Bernhagen et al.

(10) Patent No.: US 12,331,576 B2
(45) Date of Patent: Jun. 17, 2025

(54) POWERED PIVOTING FENESTRATION UNIT AND ASSOCIATED SYSTEMS AND METHODS

(71) Applicant: Pella Corporation, Pella, IA (US)

(72) Inventors: Todd A. Bernhagen, Pella, IA (US); Sebastian Tomczyk, Ames, IA (US)

(73) Assignee: Pella Corporation

( * ) Notice: Subject to any disclaimer, the term of this patent is extended or adjusted under 35 U.S.C. 154(b) by 96 days.

(21) Appl. No.: 18/103,948

(22) Filed: Jan. 31, 2023

(65) Prior Publication Data

US 2023/0243201 A1 Aug. 3, 2023

Related U.S. Application Data

(60) Provisional application No. 63/336,053, filed on Apr. 28, 2022, provisional application No. 63/305,403, filed on Feb. 1, 2022.

(51) Int. Cl.

*E05F 15/00* (2015.01)
*E05B 47/00* (2006.01)
*E05B 47/02* (2006.01)
*E05F 15/627* (2015.01)

(52) U.S. Cl.

CPC ........ *E05F 15/627* (2015.01); *E05B 47/0012* (2013.01); *E05B 47/026* (2013.01); *E05B 2047/0016* (2013.01); *E05B 2047/0018* (2013.01); *E05B 2047/0067* (2013.01); *E05Y 2201/42* (2013.01); *E05Y 2201/422* (2013.01); *E05Y 2201/46* (2013.01); *E05Y 2201/652* (2013.01); *E05Y 2201/668* (2013.01); *E05Y 2400/326* (2013.01); *E05Y 2900/148* (2013.01)

(58) Field of Classification Search

CPC ............... E05B 47/0012; E05B 47/026; E05B 2047/0016; E05B 2047/0018; E05B 2047/0067; E05Y 2201/422; E05Y 2201/46; E05Y 2201/652; E05Y 2201/668; E05Y 2400/326

See application file for complete search history.

(56) References Cited

U.S. PATENT DOCUMENTS

| | | | | |
|---|---|---|---|---|
| 6,220,422 | B1 * | 4/2001 | Lee ...................... | B65G 47/766 198/370.07 |
| 10,930,124 | B2 | 2/2021 | Farnes et al. | |
| 11,015,368 | B2 | 5/2021 | DeBoer et al. | |
| 11,798,383 | B2 | 10/2023 | Farnes et al. | |
| 2020/0056424 | A1 | 2/2020 | Farnes et al. | |

(Continued)

FOREIGN PATENT DOCUMENTS

| | | | |
|---|---|---|---|
| CA | 2957874 | A1 | 8/2017 |
| CA | 3052156 | C | 2/2020 |

(Continued)

*Primary Examiner* — Daniel J Troy
*Assistant Examiner* — Daniel Alvarez
(74) *Attorney, Agent, or Firm* — FAEGRE DRINKER BIDDLE & REATH LLP

(57) ABSTRACT

Motorized actuators for pivoting fenestration units that include both lock and open/close actuation, are addressed. Such actuators, and associated fenestration systems and methods, may achieve a variety of potential advantages, including egress functionality, ease of operation, active position control, aesthetically pleasing features (e.g., minimal design impact), intuitive controls, and others.

18 Claims, 20 Drawing Sheets

(56) References Cited

U.S. PATENT DOCUMENTS

| | | | |
|---|---|---|---|
| 2020/0131832 A1 | 4/2020 | Bernhagen et al. | |
| 2020/0370355 A1* | 11/2020 | Bernhagen | E06B 3/38 |
| 2022/0316265 A1 | 10/2022 | Farnes | |
| 2023/0250685 A1 | 8/2023 | Curtis et al. | |

FOREIGN PATENT DOCUMENTS

| | | | |
|---|---|---|---|
| CA | 3156207 | A1 | 2/2020 |
| CA | 3011471 | C | 10/2021 |

* cited by examiner

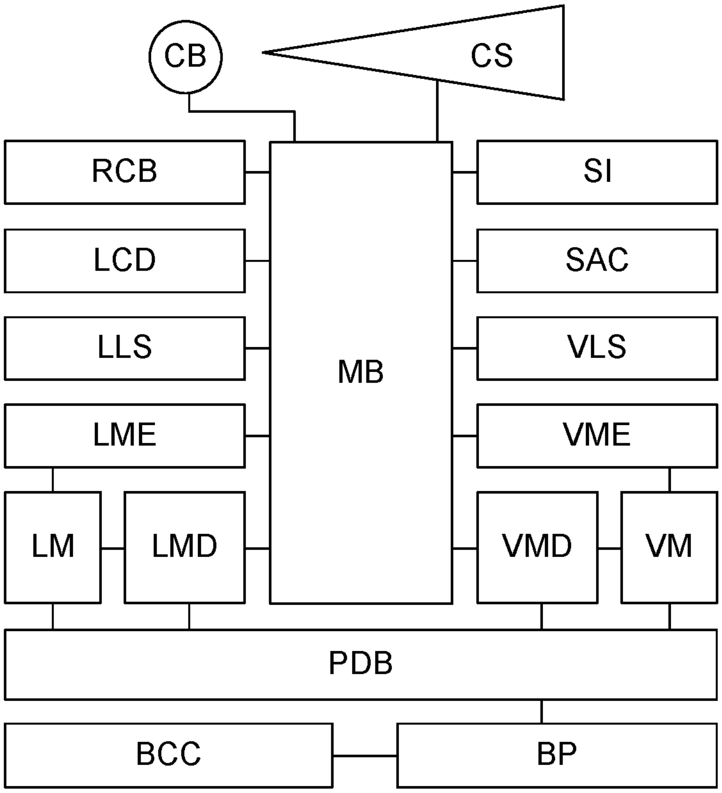

MB - Main board
CB - Capacitive button
CS - Capacitive slider
RCB - Radio control board
LCD - Liquid crystal display
LLS - Lock limit switches
LME - Lock motor encoder
LMD - Lock motor driver
LM - Lock motor
PBD - Power distribution board
SI - Serial interface
SAC - sash angularity sensor
VLS - Vent limit switches
VME - Vent motor encoder
VMD - Vent motor driver
VM - Vent motor
BP - Battery pack
BCC - Battery charging circuit

FIG. 34

POWERED PIVOTING FENESTRATION UNIT AND ASSOCIATED SYSTEMS AND METHODS

CROSS REFERENCE TO RELATED APPLICATION

This application claims priority to U.S. provisional patent application No. 63/305,403, filed Feb. 1, 2022, and to U.S. provisional patent application No. 63/336,053 filed Apr. 28, 2022, each of which is incorporated herein by reference in its entirety.

BACKGROUND

Automated, or motorized, fenestration units such as windows and doors generally include some form of actuator (e.g., an electric motor) coupled with control and user interface systems (e.g., whether onboard and/or connected remotely). Such systems may include automation, or motorization, of the locking mechanism, opening/closing mechanism, or other operative conditions of windows and doors. A variety of systems are directed to sliding doors, whereas examples relating to pivoting fenestration units (e.g., casement and awning windows) may prove more challenging. Casement windows have a sash that is attached to a frame by one or more hinges at a side of the frame, or window jamb. Window sashes hinged at the top, or head of the frame, are referred to as awning windows, and sashes hinged at the bottom, or sill of the frame, are called hopper windows. Any of these configurations may be referred to simply as hinged fenestration units, or pivoting fenestration units. Typically, such hinged fenestration units are opened by simply pushing on the sash directly, or through the use of hardware including cranks, levers, or cam handles. In various examples, operators are placed around hand height or at the bottom/sill of the unit. Such operators typically require a user to impart a swinging or rotational motion with some form of crank handle. This type of operator hardware may have one or more undesirable traits for some hinged fenestration unit designs, including requisite location (e.g., sill, interiorly protruding), associated appearance (e.g., crank style), or form of operability (e.g., rotating/cranking/swinging).

As one example, U.S. Pat. No. 10,808,424 filed Apr. 30, 2018 to Criddle et al., discusses an electronic remote lock actuator that includes a motor disposed in a housing, and a drive bar configured to be linearly moveable along a longitudinal axis by the motor. The drive bar includes a first end configured to be secured to a second drive bar of a mechanical remote lock assembly such that linear movement of the first drive bar is translated to linear movement of the second drive bar along the longitudinal axis.

As another example, Canadian Patent 2 308 972 filed May 19, 2000 to Andre LaBarre, discusses a motorized operator for opening and closing a window sash relative to a window frame via an arm mechanism connected to the window frame. The operator is adapted to be installed in a cavity defined in the window frame. The operator comprises a motor, a drive axle rotated by the motor, and first and second gears in meshed engagement. The first gear is mounted on the drive axle, while the second gear is mounted to the arm mechanism such that motorized rotation of the first gear rotatably drives the second gear thereby causing the arm mechanism to pivot for opening and closing the window sash. A manual operator is adapted to disengage the first and second gears from one another while becoming engaged to the second gear for manually rotating the second gear and so manually operate the arm mechanism. The manual operator comprises a handle and a manual actuator which includes a sprocket. The manual actuator is engageable on the drive axle for selectively displacing the first gear along the drive axle and cause the latter to disengage from the second gear while the sprocket of the manual actuator becomes engaged to the second gear, whereby a rotation of the manual actuator by way of the handle causes rotation of the sprocket and of the second gear and thus also a pivot of the arm mechanism.

In terms of commercial products, one standard type of motorized casement driver includes chain drive actuator systems. Examples of such systems include those sold under the tradename "SENTRY II" by Amesbury Group Inc. of Minneapolis, Minnesota, as well as the "ELTRAL K20" by G-U BKS of Ditzingen, Germany. Potential issues with chain drive actuator systems include lack of egress ability, slow acting actuation, and a bulky, "add-on" appearance.

For examples of operators for use with pivoting fenestration units, reference may be had to U.S. Pub. 2020/0370355 filed May 26, 2020 to Bemhagen et al., which discusses slide operator assemblies and components for fenestration units, as well as associated methods of manufacture and use thereof. Various examples from that disclosure relate to sliding operator assemblies and associated fenestration units, systems, components and methods of use and assembly. Some aspects relate to sliding operator assemblies that transition a first, linear actuation force along a first axis (e.g., vertical) to a second actuation force along a second axis (e.g., horizontal) that is angularly offset from the first axis to cause an operator assembly to impart opening and closing forces, respectively, on the sash. Some examples relate to belt-, twisted wire-, or band-drive sliding operator assemblies. Advantages include the ability to have a low-profile actuator that does not substantially project into the viewing area or otherwise impede a view of the fenestration unit, has reduced operating forces, and/or has enhanced handle positioning, for example.

SUMMARY

Motorized actuators for pivoting fenestration units, including both lock and open/close actuation, are addressed. Such actuators, and associated fenestration systems and methods, may achieve a variety of potential advantages, including egress functionality, ease of operation, active position control, aesthetically pleasing features (e.g., minimal design impact), intuitive controls, and others. Some non-limiting examples of such systems and methods are described below.

According to one example ("Example 1"), a powered operator system for a fenestration unit, the powered operator system comprising an operator motor assembly having an output pulley oriented in a first direction, an operator assembly having an input pulley oriented in a second direction that is substantially perpendicular to the first direction, and a drive belt extending between the output pulley and the input pulley to operably couple the operator motor assembly to the operator assembly, the drive belt defining a twisted configuration between the output pulley and the input pulley.

According to another example ("Example 2"), further to the system of Example 1, the fenestration unit has a plurality of frame members including a first frame member, and further wherein the output pulley and the input pulley are both positioned proximate the first frame member.

According to another example ("Example 3"), further to the system of Example 1, the fenestration unit has a plurality of frame members including a first frame member and a second frame member coupled to the first frame member, and further wherein the operator assembly is located on the first frame member and the operator motor is located on the second frame member.

According to another example ("Example 4"), further to the system of Example 1, the fenestration unit includes a sill and a jamb coupled to the sill, and further wherein the operator motor is located on the jamb and the operator assembly is located on the sill.

According to another example ("Example 5"), further to the system of Example 1, the operator assembly includes an input belt guide associated with the input pulley, the input belt guide including a top guide, a bottom guide, and an arcuate flange surrounding at least a portion of the drive belt to substantially inhibit slippage of the drive belt on the input pulley.

According to another example ("Example 6"), further to the system of Example 1, the operator assembly includes an output belt guide associated with the output shaft, the output belt guide including a top guide, a bottom guide, and an arcuate flange surrounding at least a portion of the drive belt to substantially inhibit belt slippage on the output pulley.

According to another example ("Example 7"), further to the system of Example 1, the drive belt is formed of a flexible material that forms a continuous loop, and further wherein the drive belt is twisted through an angle of about 90 degrees.

According to another example ("Example 8"), a powered operator system for a fenestration unit includes an operator motor having an output pulley oriented in a first direction and an output pulley coupled to the output pulley; an operator assembly having an input pulley oriented in a second direction that is substantially perpendicular to the first direction and an input pulley coupled to the input pulley, a drive belt extending between the output pulley and the input pulley to operably couple the operator motor to the operator assembly, an output belt guide associated with the output pulley, the output belt guide including a first output guide member, a second output guide member, and an arcuate output guide surface surrounding at least a portion of the drive belt to substantially inhibit belt slippage on the output pulley; and an input belt guide associated with the input pulley, the input belt guide including a first input guide member, a second input guide member, and an arcuate input guide surface surrounding at least a portion of the drive belt to substantially inhibit slippage of the drive belt on the input pulley.

According to another example ("Example 9"), further to the system of Example 8, the output belt guide includes an output guide frame portion that is configured to be mounted with the output pulley within the guide frame and rotatable within the output guide, and wherein the first output guide member and the second output guide member each include output guide belt-engaging surfaces, the first and second output guide members extending from the output guide frame at spaced apart locations and in a parallel direction, wherein the first and second output guide members are configured to engage outer surfaces of the drive belt to retain the drive belt on the output pulley during operation of powered operator system.

According to another example ("Example 10"), further to the system of Example 8, the first and second output guide belt-engaging surfaces of the first and second output guide members are generally parallel to one another.

According to another example ("Example 11"), further to the system of Example 8, the output guide belt-engaging surfaces of the first and second output guide members are spaced from one another by a distance at least as great as a distance between the outer surfaces of the drive belt.

According to another example ("Example 12"), further to the system of Example 8, the fenestration unit has a plurality of frame members including a first frame member, and further wherein the output pulley and the input pulley are both positioned proximate the first frame member.

According to another example ("Example 13"), further to the system of Example 8, the fenestration unit has a plurality of frame members including a first frame member and a second frame member coupled to the first frame member, and further wherein the operator assembly is located on the first frame member and the operator motor is located on the second frame member.

According to another example ("Example 14"), further to the system of Example 8, the fenestration unit includes a sill and a jamb coupled to the sill, and further wherein the operator motor is located on the jamb and the operator assembly is located on the sill.

According to another example ("Example 15"), further to the system of Example 8, the drive belt is formed of a flexible material that forms a continuous loop.

According to another example ("Example 16"), further to the system of Example 8, the drive belt is twisted through an angle of about 90 degrees between the input pulley and the drive shaft.

According to another example ("Example 17"), a powered operator system for a fenestration unit includes an operator motor having an output pulley, the operator motor having a powered state and an unpowered state, the operator motor spinning freely in the unpowered state; an operator assembly having an input pulley; and a drive belt extending between the output pulley and the input pulley to operably couple the operator motor to the operator assembly.

According to another example ("Example 18"), further to the system of Example 17, the operator motor is a stepper motor.

According to another example ("Example 19"), further to the system of Example 17, the operator motor is configured to be driven off a sinusoidal waveform.

According to another example ("Example 20"), further to the system of Example 17, the operator motor is characterized by an operating noise of 10 decibels or less.

According to another example ("Example 21"), further to the system of Example 17, the fenestration unit includes a sill and a jamb coupled to the sill, and further wherein the operator motor is located on the jamb and the operator assembly is located on the sill.

According to another example ("Example 22"), further to the system of Example 17, the drive belt is formed of a flexible material that forms a continuous loop, and further wherein the drive belt is twisted through an angle of about 90 degrees between the input pulley and the drive shaft.

According to another example ("Example 23"), the system of Example 17 further comprises a position sensor associated with the operator motor, the position sensor detecting an angular position of the operator motor, the position sensor optionally including a magnetic 3D hall-effect sensor.

According to another example ("Example 24"), further to the system of Example 23, the position sensor includes (i) a magnetic field sensor fixed relative to the frame and a magnet fixed relative to the operator assembly; or (ii) a magnetic field sensor fixed relative to the operator assembly and a magnet fixed relative to the frame.

According to another example ("Example 25"), a powered lock system for a fenestration unit includes an actuation system including a slide mount configured to be slidably coupled to a first frame member of a fenestration unit such that the slide mount is translatable between an active position and an inactive position, a lock motor fixedly coupled to the slide mount, and a release linkage transitionable between an extended state and a collapsed state, the release linkage pivotably coupled to the slide mount and being pivotably coupleable to the first frame member of the fenestration unit such that the slide mount is positioned in the active position when the release linkage is in the extended state and the slide mount is positioned in the inactive position when the release linkage is in the collapsed state. The system further includes a drive piston operably coupled to the lock motor such that actuation of the motor causes linear translation of the drive piston relative to the lock motor between an extended and retracted position; a link member pivotably coupled to the drive piston; and a connection member pivotably coupled to the link member, the connection member configured to be slidably mounted to a second frame member of the fenestration unit that is angularly offset from the first frame member, the connection member being translatable between a lock position and a release position, the connection member having the lock position when the drive piston is in the extended position and the release linkage is in the extended state, the connection member having the release position when the drive piston is in the retracted position and the release linkage is in the extended state, and the connection member having the release position when the release linkage is in the collapsed state. The system also includes a lock assembly operably coupled to the connection member of the actuation system such that linear actuation of the connection member causes operation of the lock assembly between a locked state when the connection member is in the lock position and an unlocked state when the connection member is in the release position.

According to another example ("Example 26"), further to the system of Example 25, the drive piston and the connection member are angularly offset by approximately 90 degrees.

According to another example ("Example 27"), further to the system of Example 25, the link member defines an angle of from 15 degrees to 75 degrees between the drive piston and the connection member when the connection member is in the release position.

According to another example ("Example 28"), further to the system of Example 25, the link member defines an angle of approximately 45 degrees between the drive piston and the connection member when the connection member is in the release position.

According to another example ("Example 29"), further to the system of Example 25, the lock motor has an output pulley, the lock motor having a powered state and an unpowered state, the lock motor spinning freely in the unpowered state.

According to another example ("Example 30"), further to the system of Example 25, the lock assembly is biased toward the unlocked state.

According to another example ("Example 31"), further to the system of Example 25, the release linkage is biased toward the extended state.

According to another example ("Example 32"), further to the system of Example 25, the release linkage has a first end, and a second end, and includes a first link and a second link pivotably coupled at a pivot connection located intermediate the first end and the second end of the release linkage, the first and second links defining a first, extended angle at which the first and second ends are spaced apart at a first spacing and a second, collapsed angle at which the first and second ends are spaced apart at a second spacing that is less than the first spacing.

According to another example ("Example 33"), further to the system of Example 32, the first, extended angle is an obtuse angle and the second, collapsed angle is an acute angle.

According to another example ("Example 34"), further to the system of Example 25, the link member, drive piston and connection member form a toggle mechanism at a corner defined by the first and second frame members exhibiting an increased mechanical advantage for driving the connection member as the link member and connection member approach a state of alignment.

According to another example ("Example 35"), a powered operator system for a fenestration unit includes an operator motor having an output pulley oriented in a first direction; an operator assembly coupled to the output pulley of the motor; and a control system connected to the operator motor. The control system includes a position sensor able to acquire real time position information of the lock assembly, and a controller receiving the real time position information, the controller being configured to operate the operator motor transition of the operator assembly between an open position and a closed position, and further wherein the controller is configured to operate the operator motor to actively maintain a position of the operator assembly in an intermediate position between the open position and the closed position.

According to another example ("Example 36"), further to the system of Example 35, the position sensor is an angularity sensor associated with the operator motor.

According to another example ("Example 37"), the system of Example 35 further includes a display connected to the controller, the display providing information relating to the state of the operator assembly.

According to another example ("Example 38"), the system of Example 35 further includes a capacitance input device connected to the controller, the capacitance input device being configured to receive position input from a user of powered operator system and operate the operator motor according to the position input, the capacitance input device optionally being secured to a frame of the fenestration unit.

According to another example ("Example 39"), further to the system of Example 35, the operator motor and the operator assembly are in a parallel configuration.

According to another example ("Example 40"), further to the system of Example 35, the operator motor and the operator assembly are in an angularly offset configuration.

According to another example ("Example 41"), further to the system of Example 35, the fenestration unit includes a sill and, further wherein the operator motor and the operator assembly are both located on the sill.

According to another example ("Example 42"), further to the system of Example 35, the fenestration unit includes a sill and a jamb coupled to the sill, and further wherein the operator motor is located on the jamb and the operator assembly is located on the sill.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 34 is a schematic diagram of a control system for the fenestration unit of FIG. 1, according to some embodiments.

DETAILED DESCRIPTION

Definitions and Terminology

Figure 3:
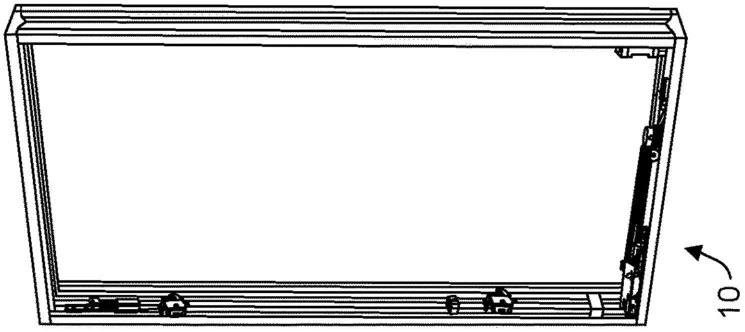
FIGS. 2 and 3 are isometric views of the fenestration unit of FIG. 1, according to some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A coordinate system is presented in the Figures and referenced in the description in which the "Y" axis corresponds to a vertical direction, the "X" axis corresponds to a horizontal or lateral direction, and the "Z" axis corresponds to the interior/exterior direction.

Any section headers in the description below are not meant to be read in a limiting sense, nor are they meant to segregate the collective disclosure presented below. The disclosure should be read as a whole. The headings are simply provided to assist with review, and do not imply that discussion outside of a particular heading is inapplicable to the portion of the disclosure falling under that heading.

DESCRIPTION OF VARIOUS EMBODIMENTS

The following description provides various examples of the inventive concepts and principles. Some aspects of the examples relate to motorized fenestration units configured for effective egress, low operating noise, ease of use, and other additional or alternative features. While some examples, associated advantages, and implementations have been disclosed, it should be understood that variations may be made consistent with the inventive concepts and principles associated therewith.

Figure 2:
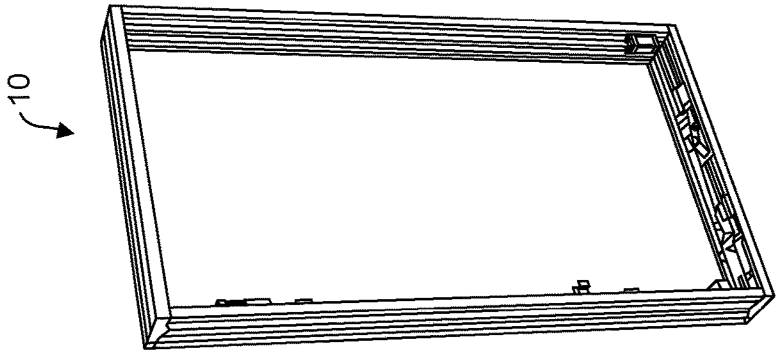
Figure 1:
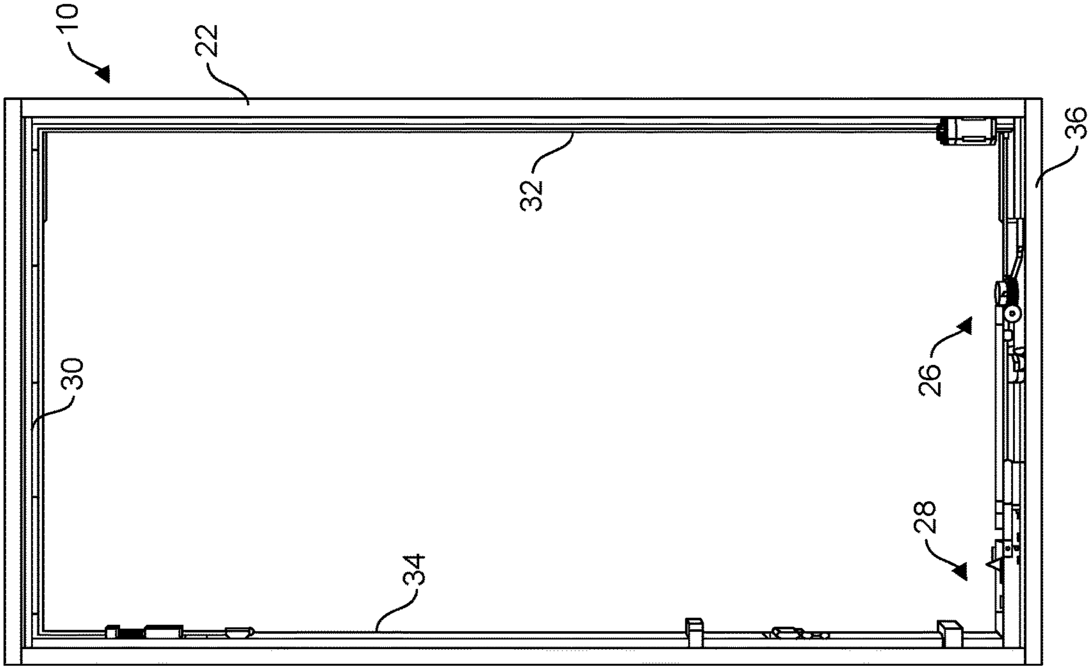
FIG. 1 is an interior view of a fenestration unit (with a sash removed), according to some embodiments.
Figure 5:
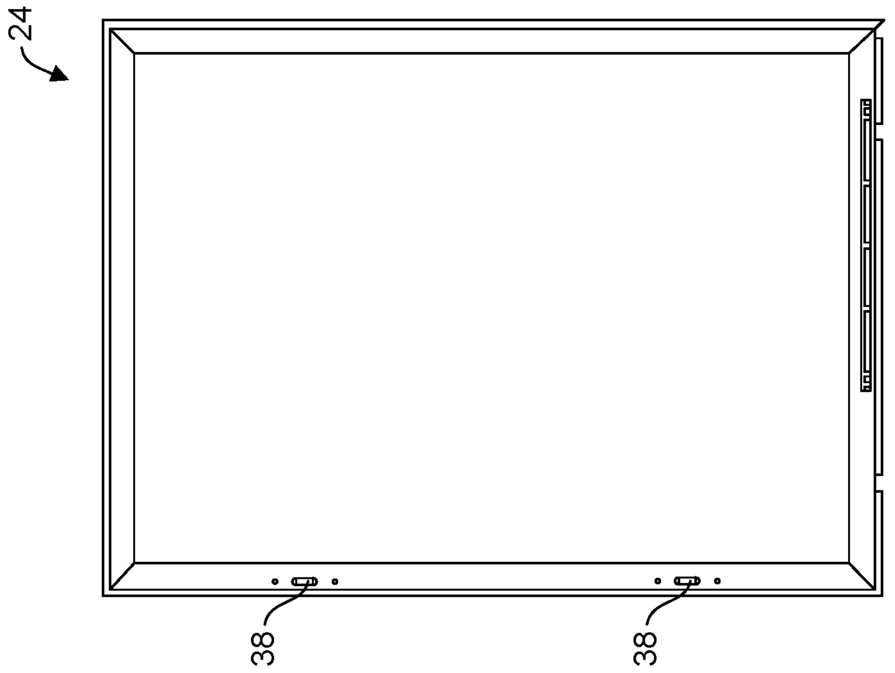
FIG. 5 is an interior view of the sash, according to some embodiments.
Figure 4:
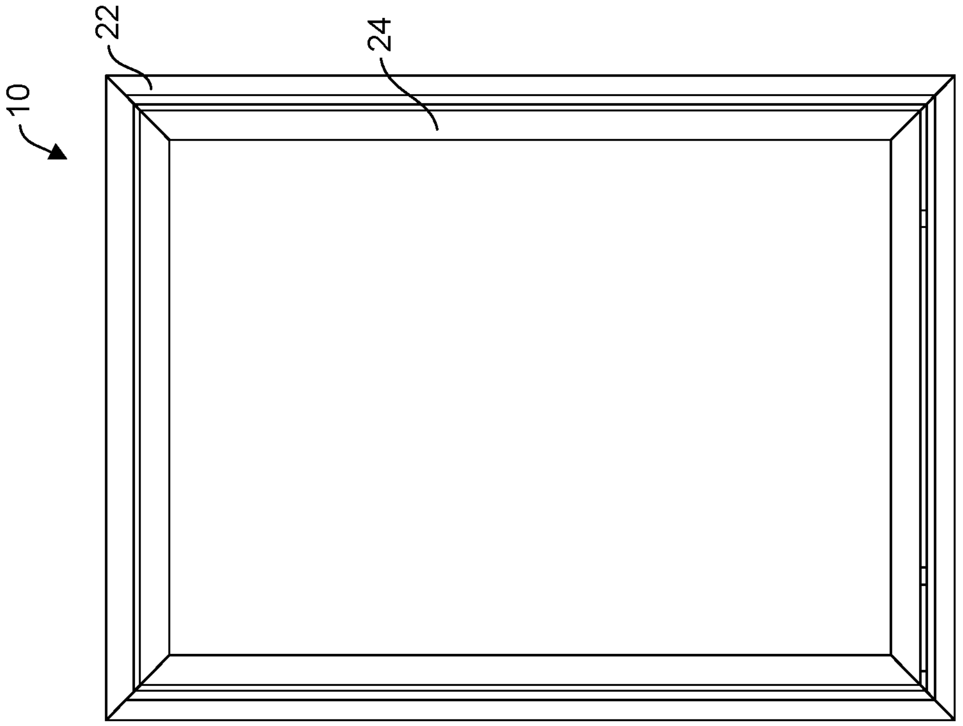
FIG. 4 is an exterior view of the fenestration unit of FIG. 1 with the sash in place, according to some embodiments.

FIG. 1 shows a fenestration unit 10, from an interior-facing side of the fenestration unit 10, according to some examples. As shown, the fenestration unit 10 includes a frame 22, a sash 24 (FIG. 5) hinged to the frame 22 such that the sash 24 is pivotable or otherwise movable (e.g., through a pivoting and swinging motion) between an open position and a closed position, a powered operator system 26 operable to transition the sash 24 between the open and closed positions, and a powered lock system 28 operable to transition the sash 24 between locked and unlocked states. In the view of FIG. 1, the interior frame covering or millwork and the sash 24 are missing (not shown) for ease of visualizing the powered operator system 26 and the powered lock system 28 and their operative assemblies associated with the remainder of the fenestration unit 10. For further visualization. FIG. 2 is a first, isometric view of the fenestration unit 10 taken from a first side angle and FIG. 3 is a second, isometric view of the fenestration unit 10 taken from a second side angle with the same components missing. FIG. 4, in turn, is an exterior view of the assembled fenestration unit 10 including the sash 24 and FIG. 5 is an interior view of the sash 24 alone.

The frame 22 and sash 24 may be any of a variety of styles and designs, including casement-, awning-, or hopper-styles as previously described. In the example of FIG. 1, the frame 22 and sash 24 are configured in the casement-style arrangement. It should also be understood that the casement example of FIG. 1 can be rotated (e.g., clockwise) by 90 degrees to present an awning window configuration and the powered operator system 26 can be adjusted in configuration as desired to facilitate operation in an awning-style configuration. Examples of suitable window frames and sashes that may be modified for use with the powered operator system 26 include those commercially available from Pella Corporation of Pella, IA under the tradename "IMPERVIA," although any of a variety of designs are contemplated.

As shown in FIG. 1, the frame 22 has a head 30, a first jamb 32, a second jamb 34, and a sill 36. As shown in FIG. 5, the sash 24 has a top rail, a bottom rail, a first stile and a second stile. Glazing (e.g., an IG unit) is supported by the rails and stiles. As shown, latch features 38 may be located on a side of the sash 24 for interacting with the powered lock system 28 (FIG. 1) to lock the sash in the closed position with respect to the frame 22 and unlock the sash to permit or release the sash for movement between the closed and open positions (e.g., through use of the powered operator system 26 or manually, as subsequently described).

Powered Operator System

Figure 6A:
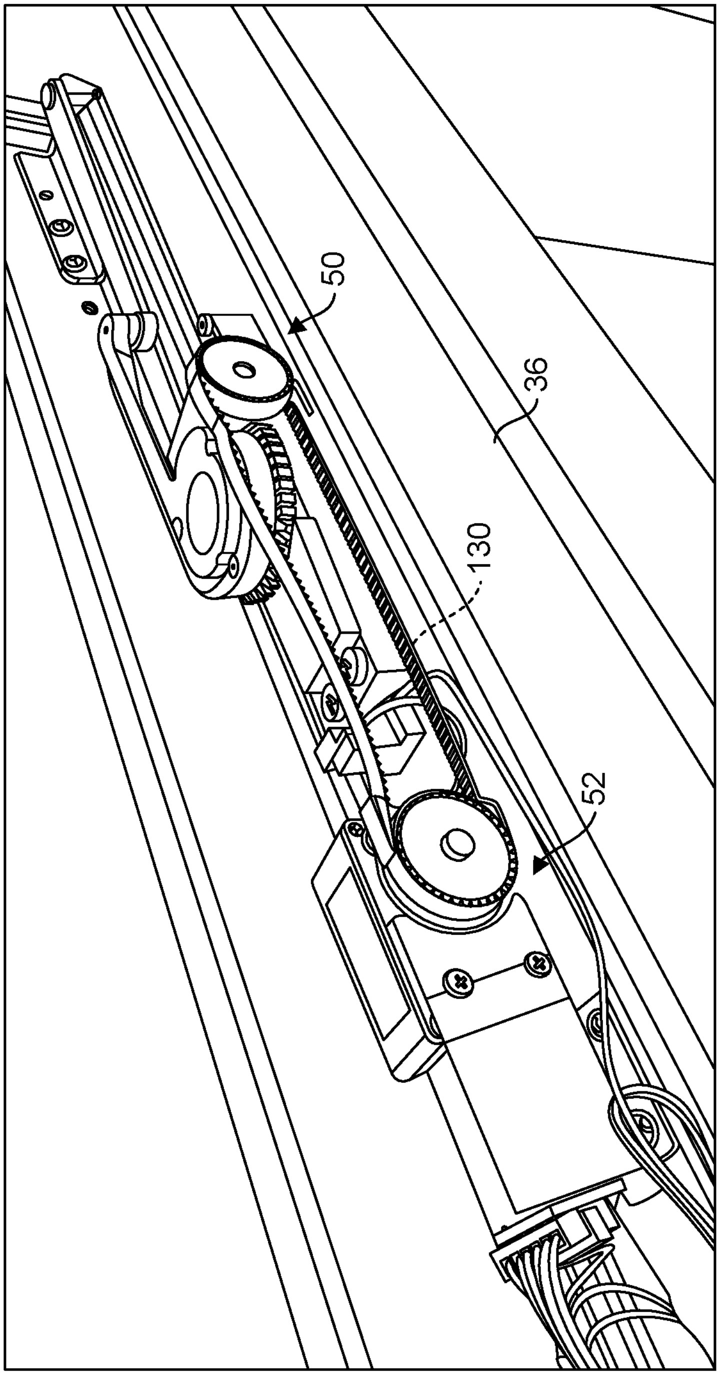
FIGS. 6A, 6B, and 7 are isometric views of powered operator and lock systems of the fenestration unit of FIG. 1, according to some embodiments.
Figure 7:
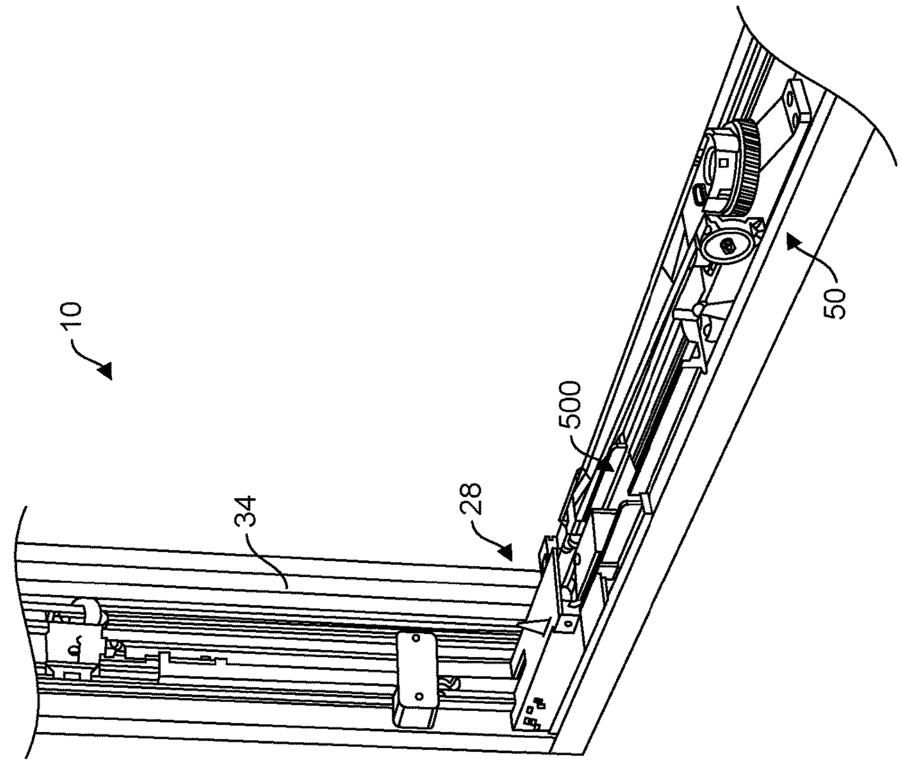
Figure 6B:
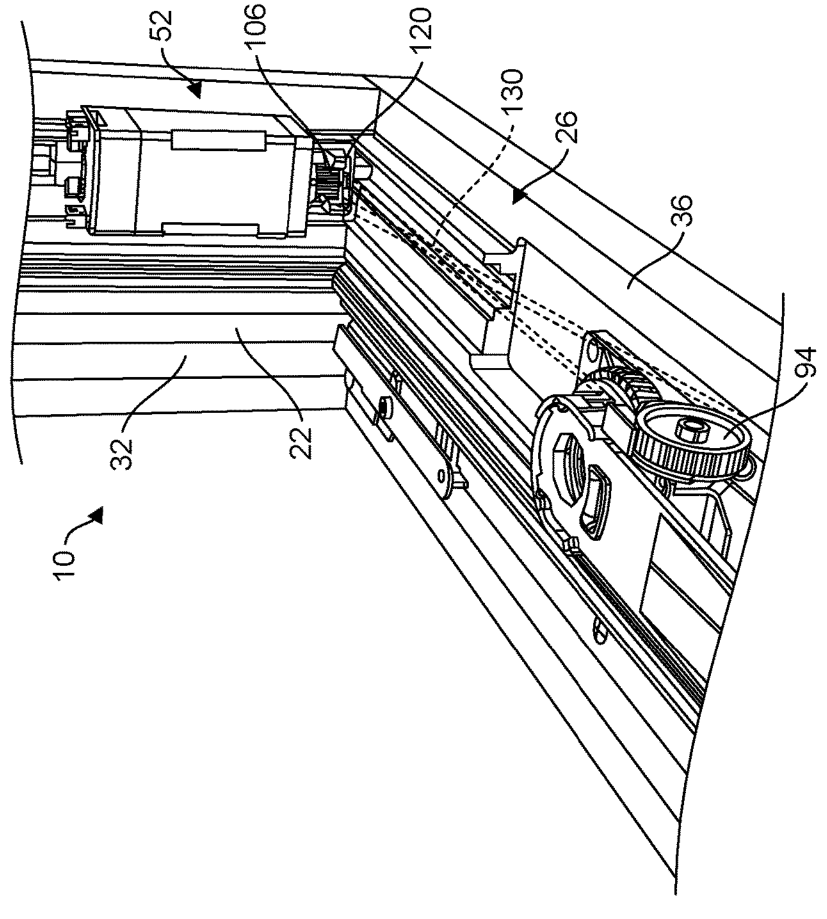
Figure 8A:
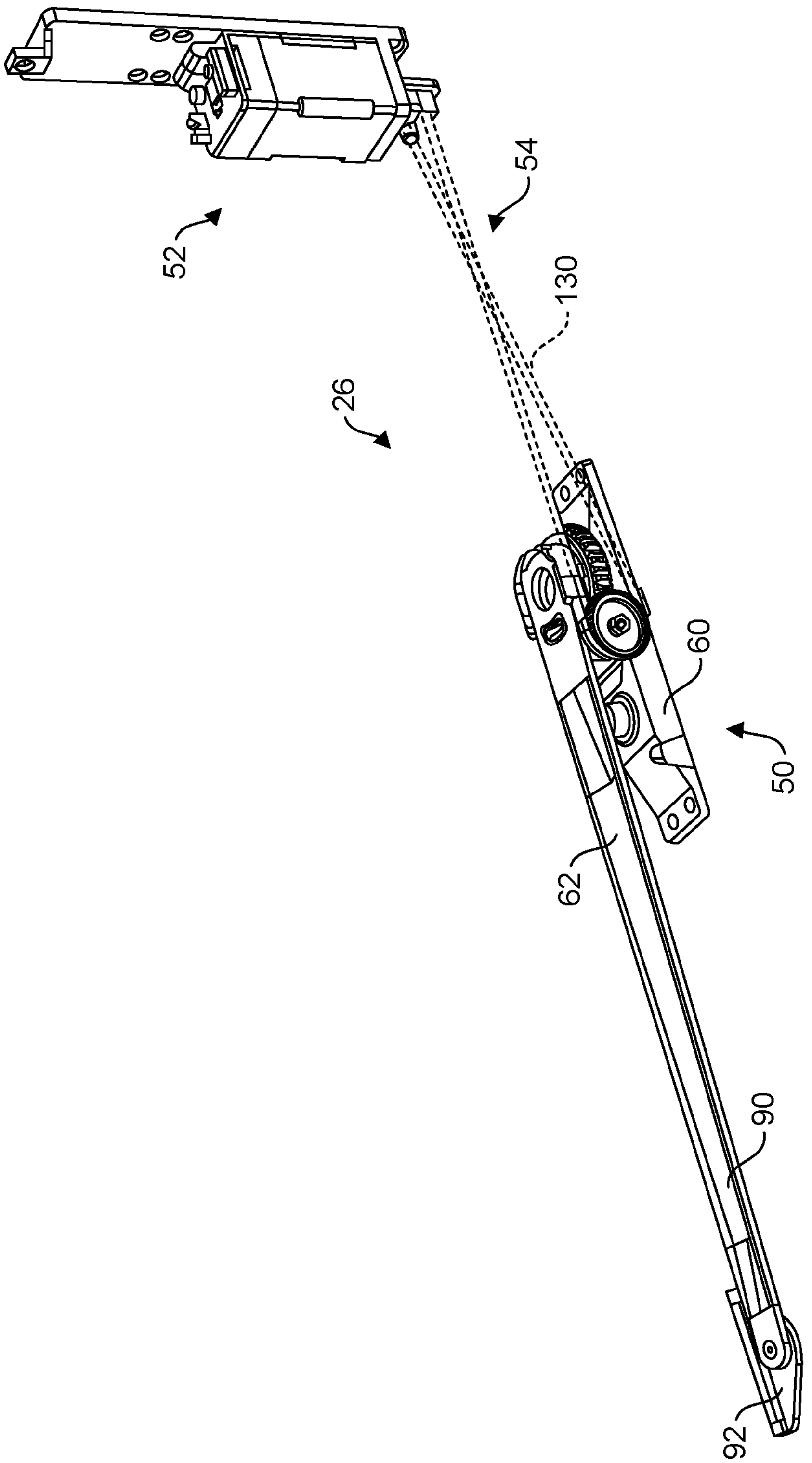
FIGS. 8A to 13 are views of components of the powered operator system, according to some embodiments.

FIGS. 6B and 7 are enlarged, isometric views of portions of the fenestration unit 10 including the powered operator system 26 and the powered lock system 28. Similarly to FIGS. 1 to 3, in FIGS. 6B and 7, the interior frame covering or millwork and the sash 24 are missing (not shown) for ease of visualizing the powered operator system 26 and the powered lock system 28 and their operative assemblies associated with the remainder of the fenestration unit 10. FIG. 6A shows an example of another configuration of the powered operator system 26. FIG. 8A shows the powered operator system 26 isolated from a remainder of the fenestration unit 10 for further visualization.

As shown collectively in the aforementioned figures, the powered operator system 26 includes an operator assembly 50, an operator motor assembly 52, and a transfer mechanism 54 operatively coupling the operator assembly 50 and operator motor assembly 52. Generally, the powered operator system 26 is configured to receive an input from a user (e.g., either remotely or through a user interface mounted on or near the fenestration unit 10) to impart an opening or closing force on the sash (FIG. 4). In some examples the configuration of the powered operator system 26 helps avoid unnecessary protrusion into, or impingement of, the viewing area or other sightlines associated with the fenestration unit 10 (e.g., as compared to traditional crank handle designs).

The operator assembly 50 is configured to receive an input force from the operator motor assembly 52 through the transfer mechanism 54 and to translate that input force into an opening force on the sash (not shown) toward the open position and a closing force on the sash toward the closed position.

As shown in FIG. 8A, the operator assembly 50 has a single-arm configuration that includes a gearbox 60 and a linkage assembly 62. Generally, the gearbox 60 is operable to receive input forces (e.g., linear through a continuous drive belt) which are then translated into rotational forces onto the linkage assembly 62 to which the gearbox 60 is operatively coupled. In some examples, a first force in a first direction causes the gearbox 60 to rotate in a first rotational direction, and a second force in a second, opposite direction causes the gearbox 60 to rotate in a second rotational direction. Though a single-arm configuration is shown, it should be appreciated that dual-arm configurations may also be implemented and may be advantageous in various contexts (e.g., awning-type applications). An example of a suitable dual-arm operator configuration can be found in U.S. application Ser. No. 16/883,481, filed May 26, 2020 by Pella Corporation, and entitled "Slide Operator Assemblies and Components for Fenestration Units" In the example shown in FIG. 8A, the operator assembly 50 is configured to be angularly offset from the operator motor assembly 52.

Figure 8B:
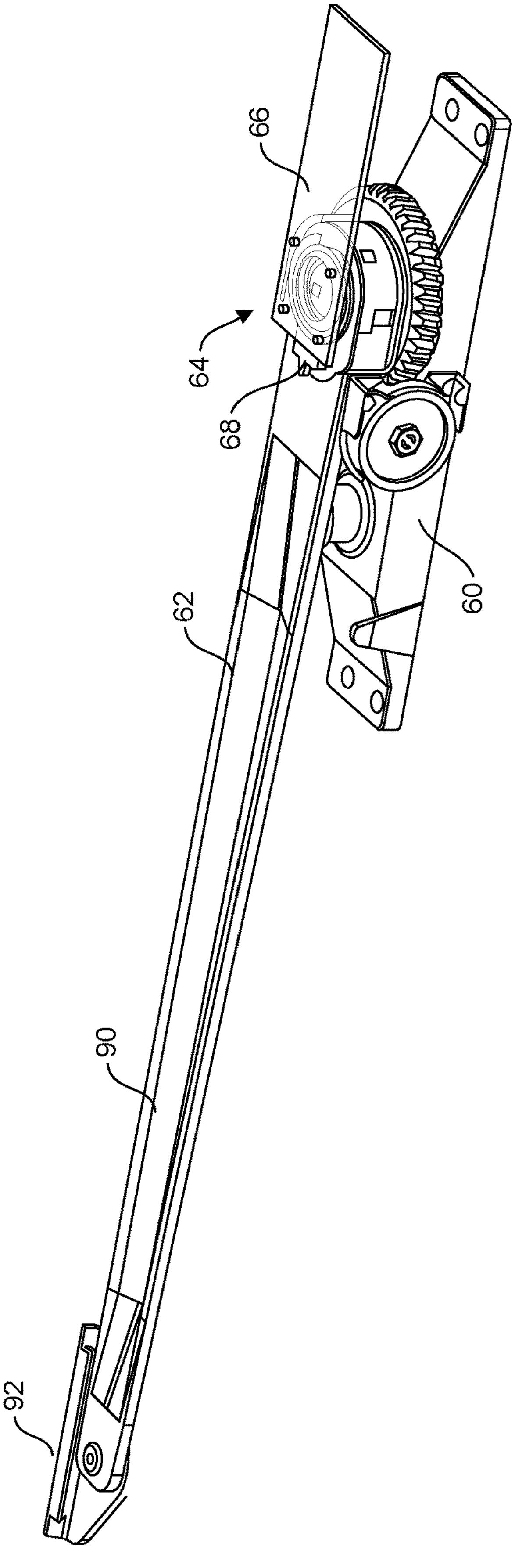
Figure 8C:
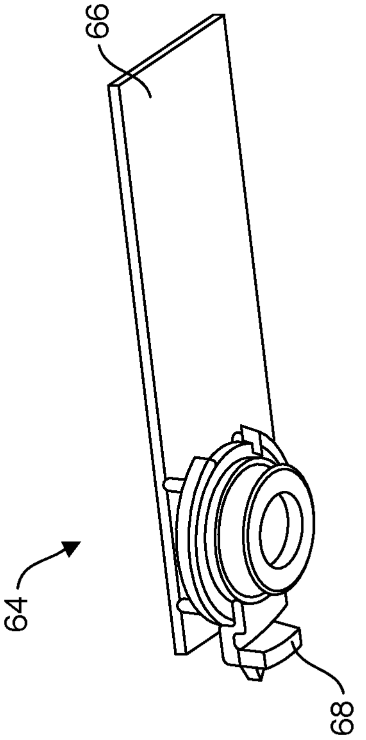

FIG. 8B shows a sash position sensor 64 mounted relative to the linkage assembly 62 and/or gearbox 60. As shown, the sash position sensor 64 includes a magnetic field sensor 66 and a magnet 68. FIG. 8C shows a lower perspective view of the sash position sensor 64. In some embodiments, the magnetic field sensor includes a printed circuit board (PCB) or other substrate carrying a microchip or other components capable of sensing the position of a nearby static or moving magnet, such as one or more Hall effect sensors. In some examples, the microchip is an MLX90935 chip available from Melexis of Ypres, Belguim. The magnetic field sensor 66 may be fixedly secured relative to the frame 22 (e.g., the sill 36). The magnet 68 may be a diametrically magnetized cylinder magnet. The magnet 68 may be fixedly secured relative to the linkage assembly 62 (e.g., the arm 90) and/or a portion of the gearbox 60 (e.g., worm gear 78 described below). With this arrangement, the magnetic field sensor 66 can sense movement (rotation) of the linkage assembly 62 and/or gearbox 60 corresponding to movement of the sash 24. In this manner, the sash position sensor 64 may sense the angular displacement of the sash 24 between open and closed positions. The component mounting may be reversed to achieve the same effect (e.g., the magnetic field sensor 66 may be fixed to the frame 22 and the magnet 68 may be fixed to the linkage assembly 62 and/or gearbox 60). As subsequently described, the sash position sensor 64 may be operably coupled (e.g., wired or wirelessly connected) to a controller or a control system of the fenestration unit 10.

Figure 8D:
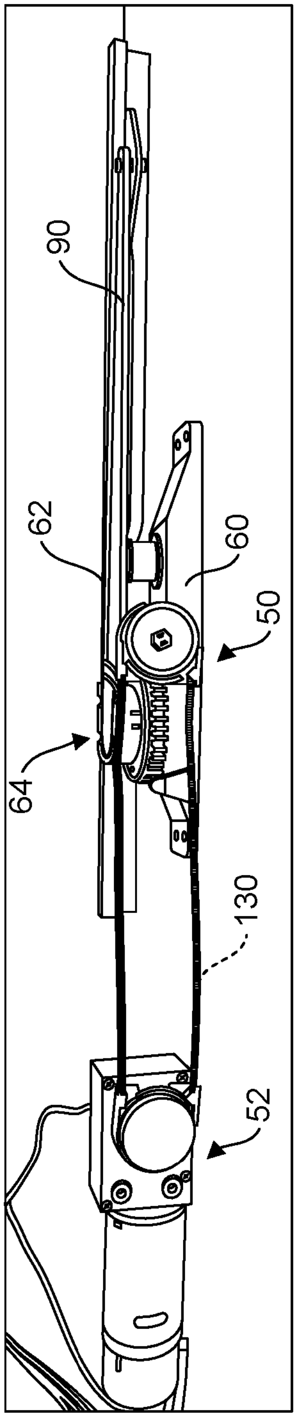
Figure 8E:
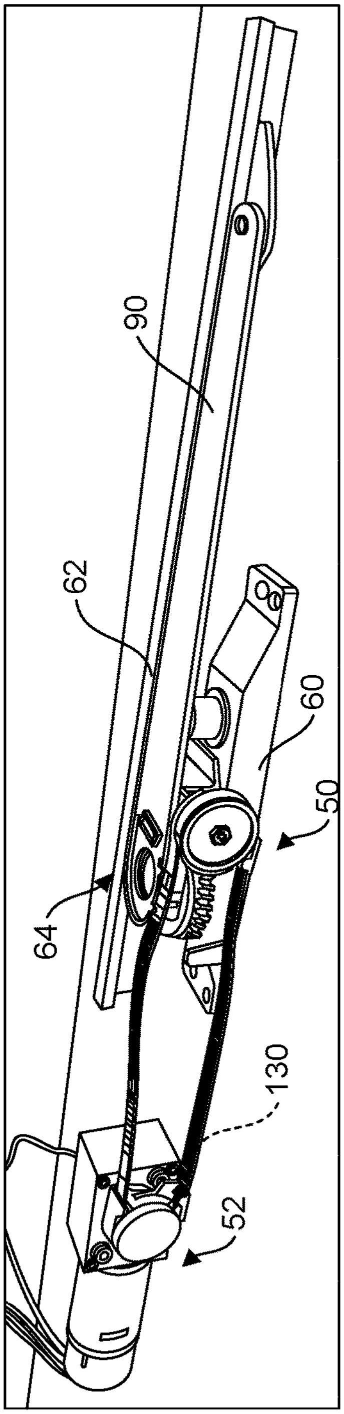
Figure 8F:
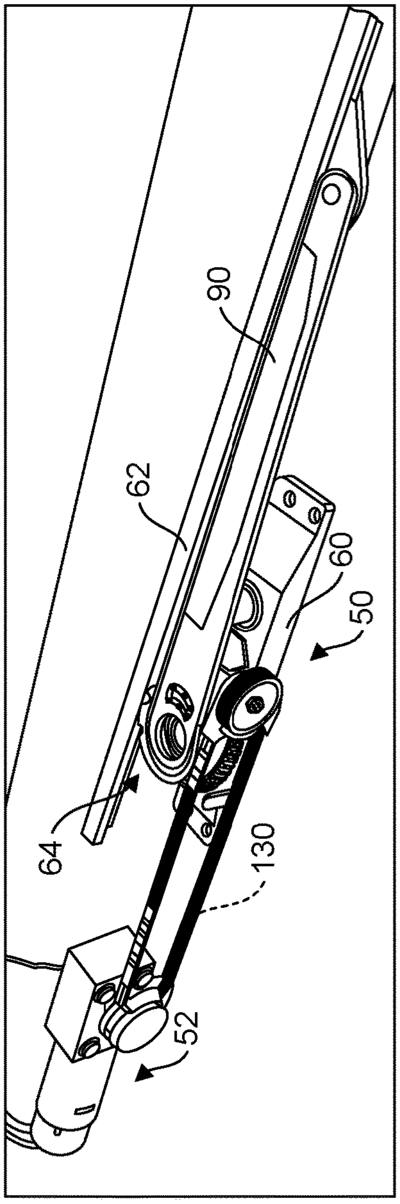

FIGS. 8D-8F also show the operator assembly 50 as a single-arm configuration that includes the gearbox 60 the linkage assembly 62, and the sash position sensor 64. Though a single-arm configuration is shown, it should be appreciated that dual-arm configurations may also be implemented and may be advantageous in various contexts (e.g., awning-type applications). In the example shown in FIGS. 8D-8F, the operator assembly 50 is shown in a parallel configuration with the operator motor assembly 52. In this parallel configuration, the operator assembly 50 may optionally employ the same overall functionality as the operator assembly 50 in the angularly offset configuration. In the parallel configuration, the sash position sensor 64 may also be operably coupled to the controller or the control system of the fenestration unit 10 as described in association with other, angularly offset configurations.

Figure 9B:
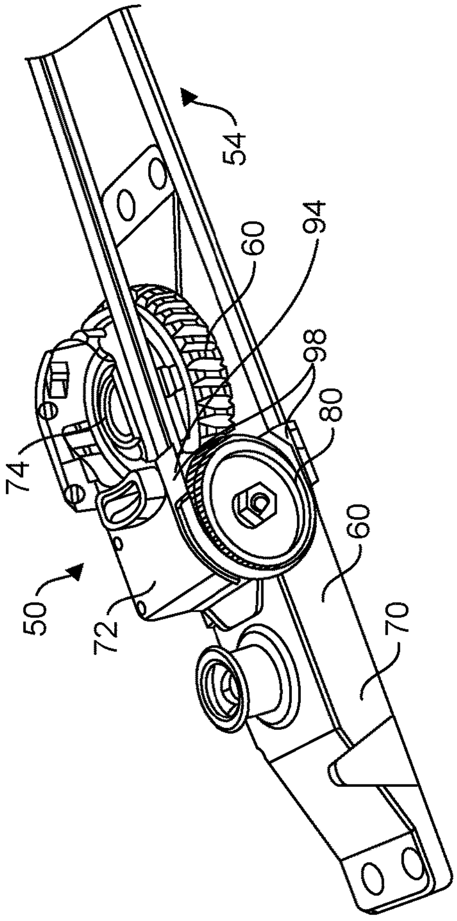
Figure 9A:
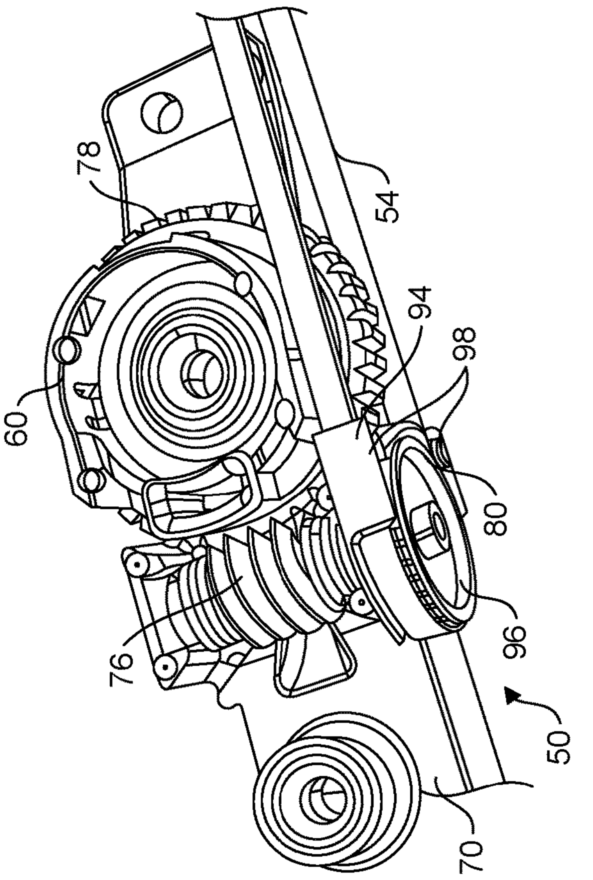

FIG. 9A is an enlarged view of the gearbox 60 and FIG. 9B is a second enlarged view of the gearbox 60 with another portion removed. As shown, the gearbox 60 includes a base 70, a worm housing 72 on the base 70 (removed in FIG. 9B), a gear mount 74 (FIG. 9B), a worm 76 (FIG. 9A), a worm gear 78 (FIG. 9A), and an input pulley 80 (FIGS. 8 to 9B). The base 70 is configured to be mounted to the frame 22 (e.g., on the sill 36) of the fenestration unit 10. The worm housing 72 is configured to house or maintain the worm 76 for rotation on the base 70.

The worm 76 is a gear in the form of a screw with helical threading. The worm gear 78 is similar to a spur gear and has teeth for engaging with the threading of the worm 76. In particular, the worm 76 is rotably engaged with a worm gear 78, such that upon rotation of the worm 76 (e.g., about an X-axis) the worm 76 engages with and rotates the worm gear 78 (e.g., about a Y-axis).

The input pulley 80 is attached to a first end of the worm 76. The input pulley 80 is configured to interact with the transfer mechanism 54 so that the worm 76 can be driven by the transfer mechanism 54. As shown, the input pulley 80 may be configured with teeth or other surface features that assist with receiving an input force. The input pulley 80 is configured to rotate (e.g., about the Z-axis) and is operatively coupled to the worm 76 through a drive shaft or other coupling mechanism with the worm 76 to rotate the worm 76.

As shown in FIG. 8A, the linkage assembly 62 includes an arm 90, and a sash brace 92 (FIG. 5). The arm 90 is coupled to the worm gear 78 (e.g., directly or indirectly) such that the rotation of the worm gear 78 imparts rotational forces on the arm 90. The sash brace 92 coupled to the sash 24 and is slidably, and pivotally connected to the arm 90, such that the rotational forces on the arm 90 result in an opening or closing swing force in the Y-Z plane on the sash brace 92. The opening or closing swing force is translated to the sash 24 (FIG. 1) by coupling the sash brace 92 to the sash 24 (e.g., at the bottom rail of the sash 24).

Figure 10B:
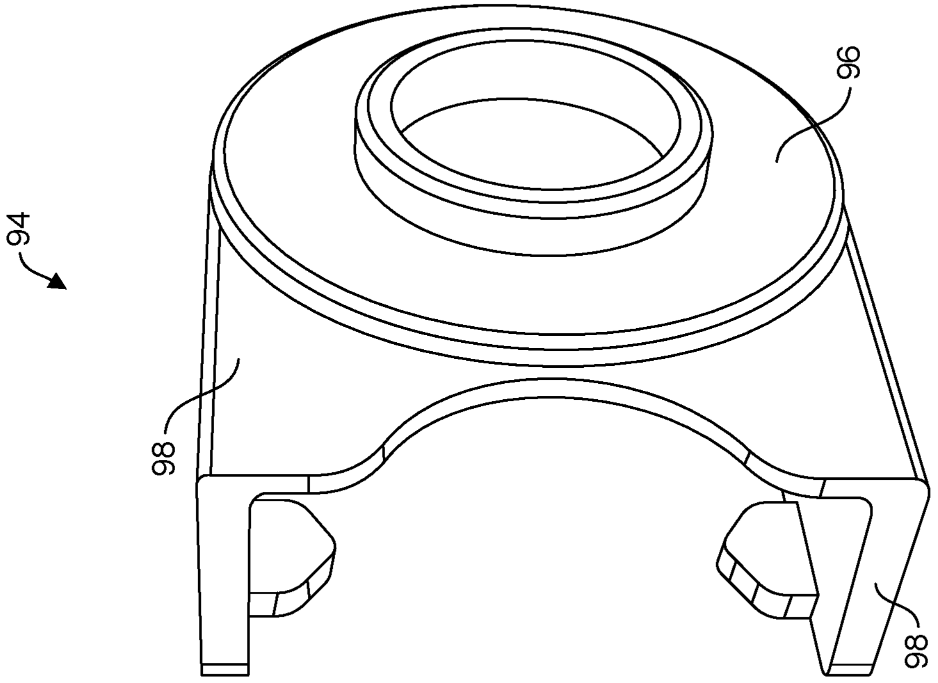
Figure 10A:
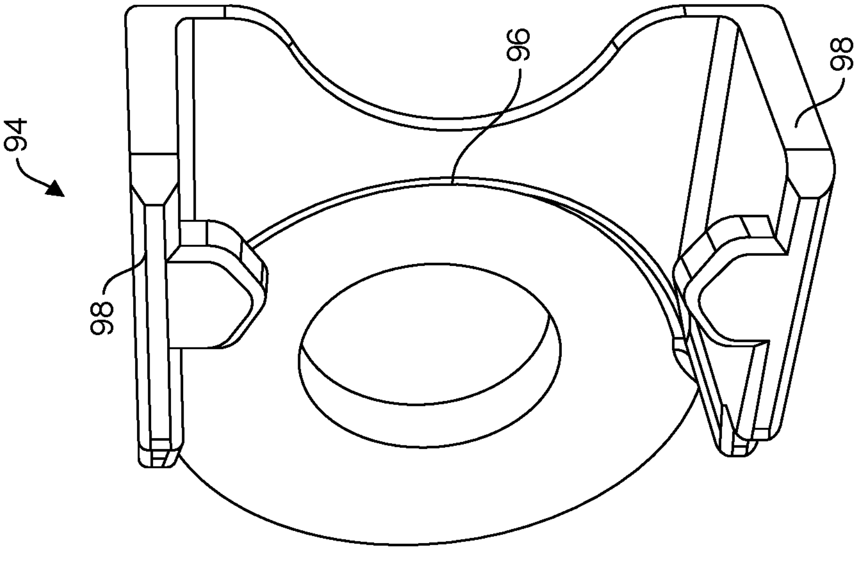

As shown in FIG. 9A, the operator assembly 50 may include an input belt guide 94 mounted over the input pulley 80 to help retain a drive belt on the input pulley 80 during operation. The belt guide 94 also may help prevent slippage of the drive belt and/or tooth skipping of the drive belt on the input pulley 80. FIG. 10A and FIG. 10B are isometric views of the input belt guide 94, according to some embodiments. As shown, the input belt guide 94 includes a frame portion 96 and first and second guide members 98 extending from the frame portion, each of the first and second guide members 98 include tabs or edge members extending from the first and second guide members 98, respectively. The frame portion 96 is defined by a diameter, and includes an aperture defining a mounting axis. As shown, the belt guide 94 is mounted adjacent to the input pulley 80.

The first and second guide members 98 extend from the frame portion 96 in directions generally transverse to the diameter of the input belt guide 94 at spaced apart locations. In the illustrated embodiments, the first and second guide members 98 extend from the frame portion 96 at locations corresponding to the ends of the diameter of the input belt guide 94. The inwardly facing surfaces of the first and second guide members 98 that face one another are configured to engage with a drive belt 130 (shown in FIG. 8A). In the illustrated embodiments, such belt-engaging surfaces are generally planar and parallel to one another. However, such belt-engaging surfaces may be curved or take other forms.

As shown, the tabs or edge members of the guide members 98 may extend toward one other adjacent to the sides of a drive belt 130 (shown in FIG. 8A) received in the input belt guide 94. In such instances, the edge members may help form a channel with the associated guide members 98 and the frame portion 96 to engage the sides or edges of a drive belt in the event the drive belt slides sideways on the input pulley 80.

Figure 11:
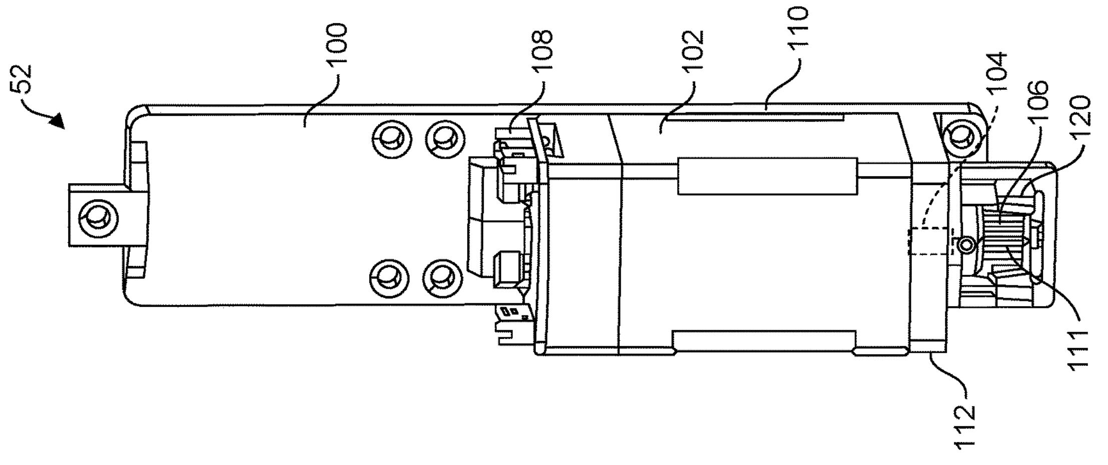

FIG. 11 is an isometric view of the operator motor assembly 52. As shown, the operator motor assembly 52 includes an operator motor mount 100, an operator motor 102, an output shaft 104 oriented in a first direction (e.g., vertically) and an output pulley 106 coupled to the output shaft 104. For reference, the output pulley 106 may also be considered an output shaft and vice versa in various embodiments. In some examples, the motor assembly 52 further includes a position sensor 108 coupled to the operator motor 102 and which detects an angular position of the operator motor 102 (e.g., a magnetic 3D Hall-effect sensor).

The operator motor mount 100 is configured to attach to the frame 22 of the fenestration unit 10, for example to one of the jambs as shown in FIG. 6B. The operator motor mount 100 may include a back 110 and a bottom support 112 for supporting the operator motor 102. In other examples, the operator motor mount may be configured to attach to the frame 22 of the fenestration unit 10, for example on the sill 36, which is shown in FIG. 6A.

The operator motor 102 is operable to rotate the output shaft 104. The operator motor 102 has a powered state and an unpowered state. In various embodiments, in the unpowered state, the operator motor 102 spins freely and in the powered state the operator motor 102 either holds its position or rotates the output shaft 104 in a first direction or a second direction. In some examples, the operator motor 102 is a stepper motor. The operator motor 102 may be configured to be driven off a sinusoidal waveform. Use of a sinusoidal waveform with a stepper motor for the operator motor 102 may result in a lowered operating noise. For example, the operator motor may be characterized by an operating noise of 10 decibels or less. For reference, the operating noise according to embodiments disclosed herein was measured for the entire fenestration system during opening and closing and was recorded as being approximately 10 decibels. Therefore, the operating noise of the motor alone would clearly be 10 decibels or less in the fenestration unit 10. As shown, the operator motor 102 rests against the back 110 and on the bottom support 112, with the output shaft 104 projecting through the bottom support 112.

In another example, shown in FIG. 6A, the operator motor 102 may be a DC motor. In this example the operator motor 102 does not spin freely in the unpowered state for a quick egress function. This feature of a DC motor may be more appropriately used in an awning or hopper style window, for example.

As shown in FIG. 11, the output pulley 106 that is coupled to the output shaft 104 is generally cylindrical and has a has teeth, or a toothed portion 111, for engaging with a drive belt, for example, as subsequently described. As shown perhaps in more detail in FIG. 12, the output pulley has an upper flange 114 and a lower flange 116 bounding the toothed portion 111.

Figure 12:
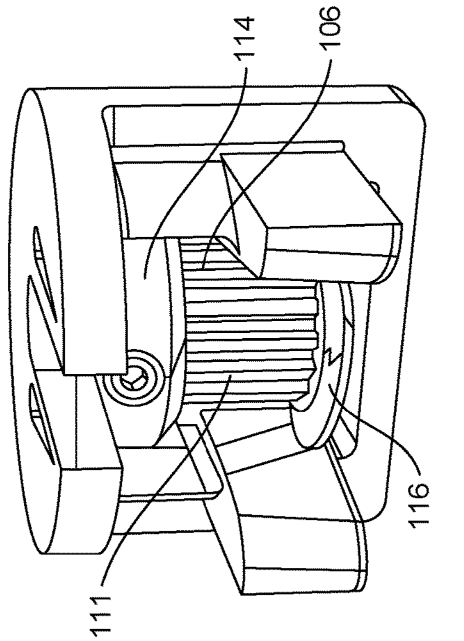
Figure 13:
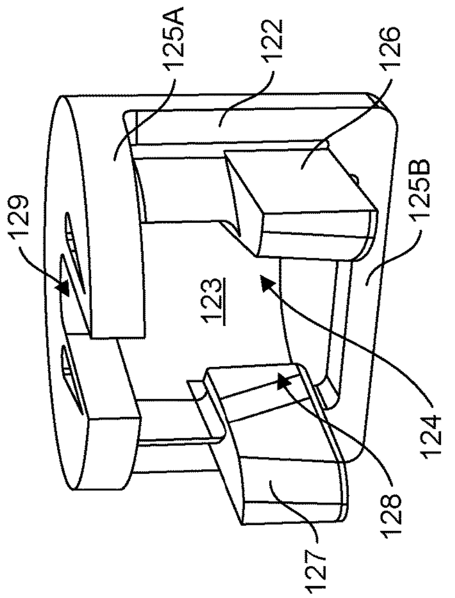

As shown in FIG. 11, the operator motor assembly 52 also includes an output belt guide 120, which as shown in FIG. 12, and houses the output pulley 106. FIG. 13 shows the output belt guide 120 further isolated from the remaining components of the operator motor assembly 52. As shown, the output belt guide 120 includes a frame portion 122 having an output guide surface 123 (e.g., which is arcuate, as shown) that defines a pocket 124 between a top 125A, and a bottom 125B and the output guide surface 123. The pocket 124 is configured to receive the output pulley 106. The output belt guide 120 includes first and second output guide members 126, 127 extending from the frame portion 122. As shown, the first and second output guide members 126, 127 extend parallel to one another and bound a mouth 128 through which a drive belt can project, as will be subsequently described. As shown, the frame portion 122 also further defines a top slot 129, also described as a top aperture 129.

The output belt guide 120 may be secured relative to the output shaft 104 in a variety of manners. For example, the output belt guide 120 may be coupled to the output shaft 104 via a snap-fit arrangement such that the output belt guide 120 is able to rotate freely around the output shaft 104. Generally, the output shaft 104 is passed through the bottom support 112 and the top slot 129, such that the output shaft 104 may rotate within the top slot 129 with the output pulley 106. The output pulley 106 is then received in the pocket 124.

As shown in FIGS. 12 and 13, the output pulley 106 is received in the pocket 124 such that the upper flange 114 and lower flange 116 are positioned above and below portions of the first and second output guide members 126, 127, helping to retain the output pulley 106 in place. The output pulley 106 is received in the pocket 124 such that the toothed portion 111 is spaced from the output guide surface 123 to provide a gap for permitting a drive belt to be received between the toothed portion 111 and the output guide surface 123 and pass through the mouth 128.

As shown in FIG. 8A, the transfer mechanism 54 includes a drive belt 130 (shown in broken lines). The drive belt 130 may be a generally ribbed or toothed belt that is flexible and resilient and defines a continuous loop. For reference, the ribs or teeth of the drive belt 130 are generally not shown in the figures for ease of illustration. Generally, the ribs or teeth run transversely across at least one face (e.g., the face that is toward complementary teeth or ribbing of various pulley, handle, and tensioner features) of the drive belt 130 to engage with the various features of the system (e.g., pulley, handle and tensioner) subsequently described. In a general sense, such the design of the drive belt 130 may be similar to serpentine drive belt designs in automobile applications. As another example, the drive belt 130 may be similar to the drive belts shown and described in U.S. App. Pub. 2020/0370355, filed May 26, 2020 by Bernhagen et al. or U.S. App. Pub. 2009/0283227, filed Apr. 2, 2009 by Mohat et al. Other drive belt designs (e.g., wires, flat ribbons, and others) are also contemplated.

As shown in FIGS. 6B and 8, the input pulley 80 and the output pulley 106 are angularly offset from one another, such as by about 90 degrees. For example, the input pulley 80 is generally oriented with an axis of rotation parallel to the interior-exterior direction and the output pulley 106 is generally oriented with an axis of rotation parallel to a vertical direction, or to the longitudinal axis of the side of the frame. As a result, the drive belt 130 extends through a twisted path, and, in some examples, the drive belt 130 is twisted through an angle of about 90 degrees.

In other examples, as shown in FIG. 6A, the input pulley 80 and the output pulley 106 are oriented parallel to each other. For example, the input pulley 80 and output pulley 106 are both generally oriented with an axis of rotation parallel to the interior-exterior direction. Due to this arrangement, the drive belt 130 may have a simple, looped configuration and not extend through a twisted path as described in association with other embodiments. In this parallel configuration, the input pulley 80 and output pulley 106 can optionally employ the same overall functionality and operation as described in association with other, angularly offset configurations. This arrangement with the input and output pulleys 80, 106 in a parallel orientation may be more appropriately used with awning or hopper style windows, for example.

The drive belt 130 extends into the output belt guide 120 through the mouth 128 (FIG. 13), which, as previously described, is associated with the output shaft 104 and the output pulley 106. The drive belt 130 passes out away from the output belt guide 120 through the mouth 128. A portion of the drive belt 130 is surrounded by the first and second output guide members 126, 127 (FIG. 13) and into the pocket 124 between the top 125A, bottom 125B (FIG. 13), and output guide surface 123 (FIG. 13). The opposed surfaces of the first output guide member and the second output guide member 126, 127 define output guide belt-engaging surfaces. The first and second output guide belt-engaging surfaces of the first and second output guide members 126, 127 are generally parallel to one another, and are spaced from one another by a distance at least as great as a distance between the outer surfaces, or edges of the drive belt 130.

The drive belt 130 is received between the first and second output guide members 126, 127 (FIG. 13) and within the space between the top and bottom 125A, 125B, as well as the space between the threaded portion of the output pulley 106 and the output guide surface 123 (FIG. 13). This arrangement substantially inhibits slippage of the drive belt 130 on the output pulley 106 and retains the drive belt 130 on the output pulley 106.

As shown in FIG. 6B, the drive belt 130 twists from the output belt guide 120 to the input belt guide 94. The drive belt 130 twists from a first orientation with the loop of the drive belt 130 oriented in a first plane (e.g., horizontal plane) to a second orientation with the loop of the drive belt oriented in a second plane, optionally orthogonal to the first plane (e.g., vertical plane). In other examples, as shown in FIGS. 6A and 8D-8F, the input pulley 80 and the output pulley 106 are oriented parallel to each other. Due to this arrangement, the drive belt 130 may be in the first orientation with the loop of the drive belt 130 oriented in a first plane (e.g., horizontal plane) and may not be twisted to the second orientation in the second plane as described in association with other embodiments. In the parallel configuration, the drive belt 130 can optionally employ the same overall functionality and operation as described in association with the twisted path as described in association with other embodiments. This arrangement of the drive belt 130 in the first orientation that is not twisted to the second orientation may be more appropriately used with awning or hopper style windows, for example.

The drive belt 130 extends into the input belt guide 94 to help retain the drive belt 130 on the input pulley 80 during operation. The drive belt 130 extends into the frame portion 96 and around the input pulley 80, between the first and second guide members 98 extending from the frame portion 96. The tabs or edge members of the first and second guide members 98 engage the edges of the drive belt 130 to assist with retaining the drive belt 130 on the input pulley 80 and avoid lateral slippage off the input pulley 80. As mentioned, the inwardly facing surfaces of the first and second guide members 98 that face one another are configured to engage with a drive belt. In the illustrated embodiments, such belt-engaging surfaces are generally planar and parallel to one another. However, such belt-engaging surfaces may be curved or take other forms.

As shown (see FIGS. 10A and 10B), the tabs or edge members of the guide members 98 extend toward one other adjacent to the sides of the drive belt 130 and help form a channel with the associated guide members 98 and the frame portion 96 to engage the sides or edges of the drive belt 130 to inhibit the drive belt from sliding sideways off the input pulley 80. The frame portion 96 defines an arcuate input guide surface surrounding a portion of the drive belt 130 to also help inhibit slippage of the drive belt on the input pulley 80.

The two belt guides, the input belt guide 94 and the output belt guide 120 facilitate use of the twisted configuration for the drive belt 130 by controlling feeding of the drive belt 130 and preventing slippage and binding of the drive belt 130. This also facilitates a more compact arrangement, with the output pulley 106 and the input pulley 80 are both positioned proximate a first frame member of the fenestration unit 10, such as the sill 36. Though they may each be positioned proximate the same frame member (e.g., the sill 36), the operator assembly 50 may be secured or coupled to a first frame member of the fenestration unit (e.g., the operator assembly 50 may be located on the sill 36) while the operator motor assembly 52 may be secured or coupled to a second frame member (e.g., the operator motor assembly 52 may be located on the first jamb 32, or hinge jamb shown in FIG. 1) In other examples, as shown in FIG. 6A, the operator assembly 50 and the operator motor assembly 52, including the operator motor 102, may both be secured or coupled to the first frame member (e.g., both the operator assembly 50 and the operator motor assembly 52 may be located on the sill 36). In this arrangement, the input pulley 80 and input belt guide 94 are parallel to the output pulley 106 and the output belt guide 120. The input belt guide 94 and output belt guide 120 may still be configurated and utilized to prevent slippage and binding of the drive belt 130 as described in association with other, angularly offset configurations.

Powered Lock System

Figure 14:
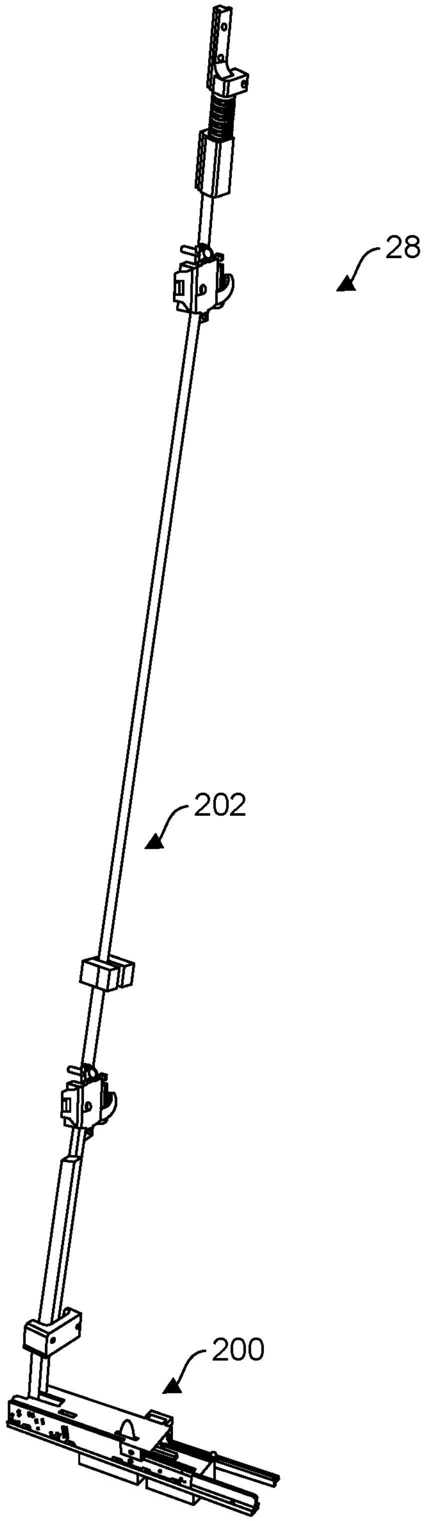
FIGS. 14 to 31 are views of components of the powered lock system, according to some embodiments.

FIG. 14 is an isolated, isometric view of the powered lock system 28. As shown, the powered lock system 28 includes an actuation system 200 and a lock system 202 operably coupled to the actuation system 200 such that actuation of the actuation system 200 causes operation of the lock assembly 202 between a locked state and an unlocked state.

Figure 15:
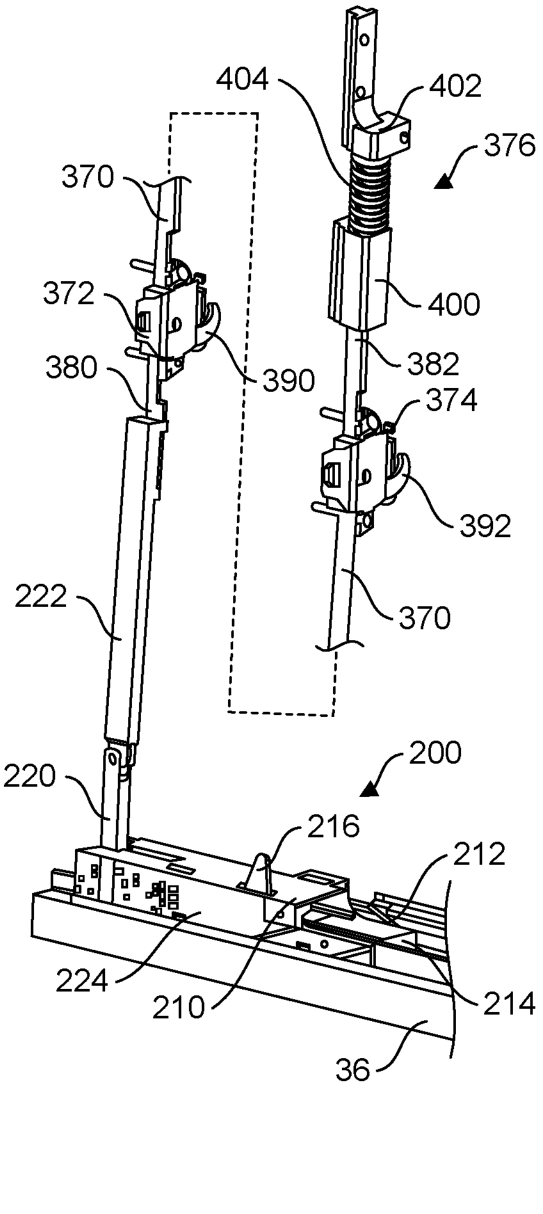

FIG. 15 shows the actuation system 200 partially isolated from the remainder of the fenestration unit 10, yet as still mounted to the sill 36. The actuation system 200 includes a fixed mount 210, a slide mount 212, a lock motor 214, a release linkage 216, a drive piston 218, a link member 220, a connection member 222 (FIG. 18), and a lock control system 224.

Figure 16:
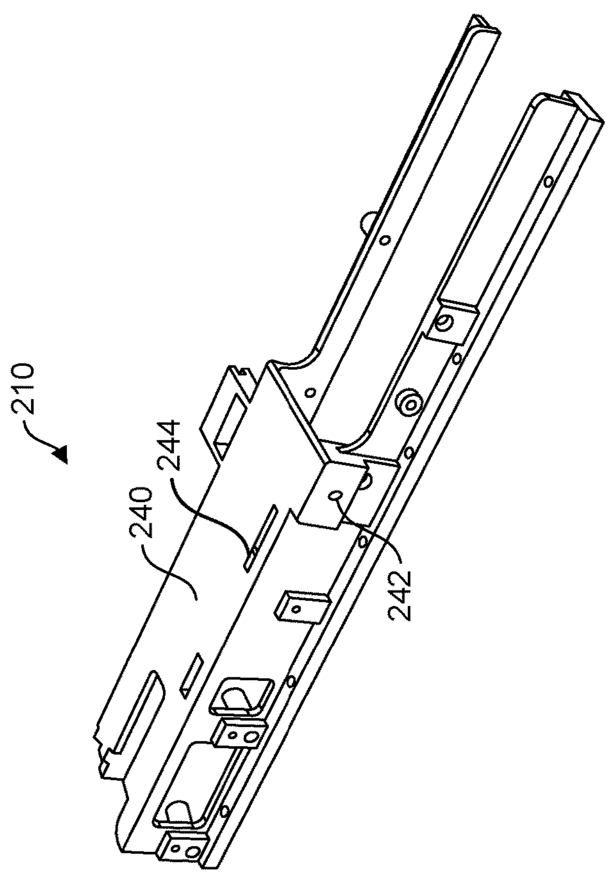

FIG. 16 is an isolated, isometric view of the fixed mount 210. As shown, the fixed mount 210 includes a housing 240 having a fixed pivot feature 242 (an aperture). The fixed mount 210 is configured to be secured to the frame 22 (e.g., the sill 36, as shown). Fasteners (e.g., screws, nails, staples) can be used to accomplish fixation of the fixed mount to the frame 22. The fixed mount 210 may also support one or more portions of the lock control system 224. The fixed pivot feature 242 is configured to be pivotably connected to the release linkage 216, as subsequently described. The fixed mount 210 may include a slot 244 or opening 244 for receiving a portion of the release linkage 216.

Figure 17:
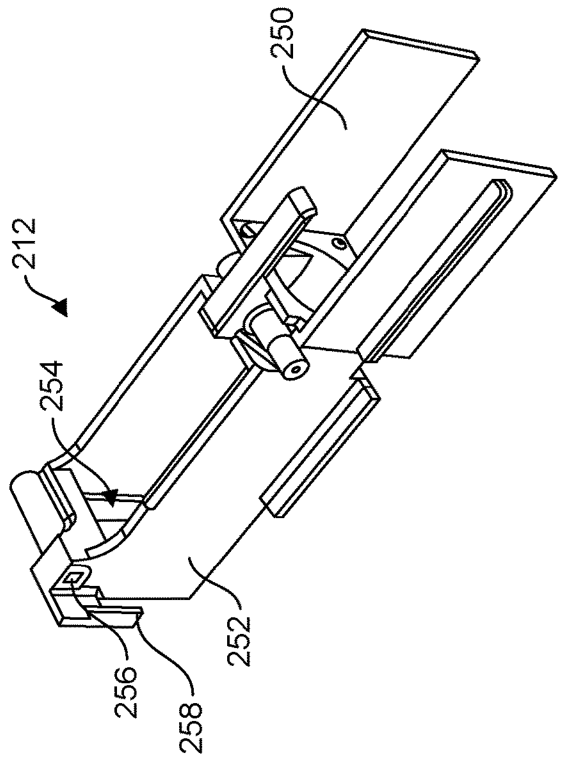
Figure 18:
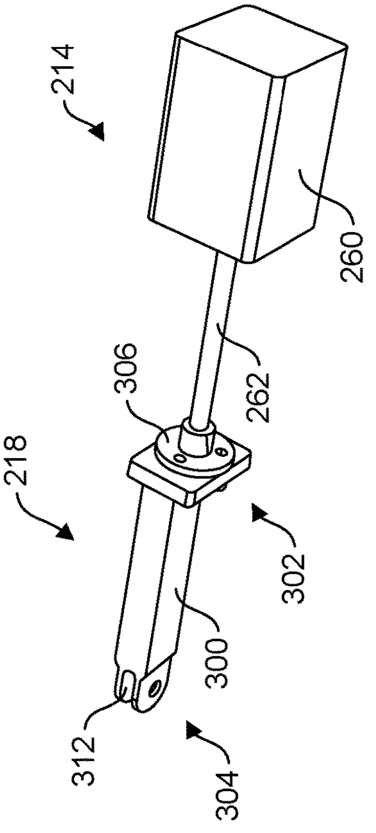

FIG. 17 is an isolated, isometric view of the slide mount 212. As shown, the slide mount 212 includes a motor housing 250 and a slide receptacle 252. The motor housing 250 is configured to fixedly receive the lock motor 214 (FIG. 18). The slide receptacle 252 has an end aperture 254 configured to receive the drive piston 218. The slide mount 212 also includes a slide pivot feature 256 (an aperture). The slide pivot feature 256 is configured to be pivotably connected to the release linkage 216, as subsequently described.

Figure 30:
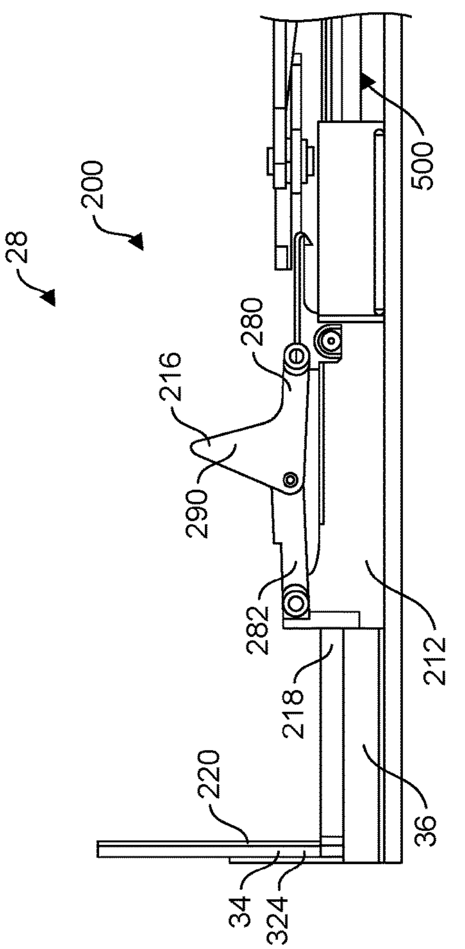
Figure 31:
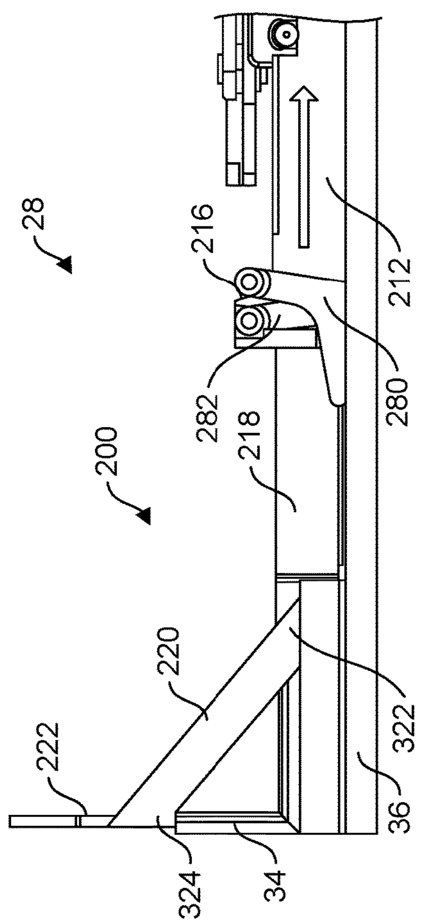

The slide mount 212 is slidably coupled to the frame 22 (e.g., the sill 36 as shown) through an adjustable coupling to the fixed mount 210, such that the slide mount 212 is translatable (slidable) between an active position (e.g., FIGS. 15 and 30) and an inactive position (e.g., FIG. 31). The frame 22 (the sill 36, as shown) may include a pocket, or channel 256 (e.g., FIG. 7) for slidably receiving the slide mount 212, as well as receiving a portion of the fixed mount 210. The pocket or channel 256 may be routed or otherwise formed into the frame 22 (e.g., the sill 36).

Figure 19:
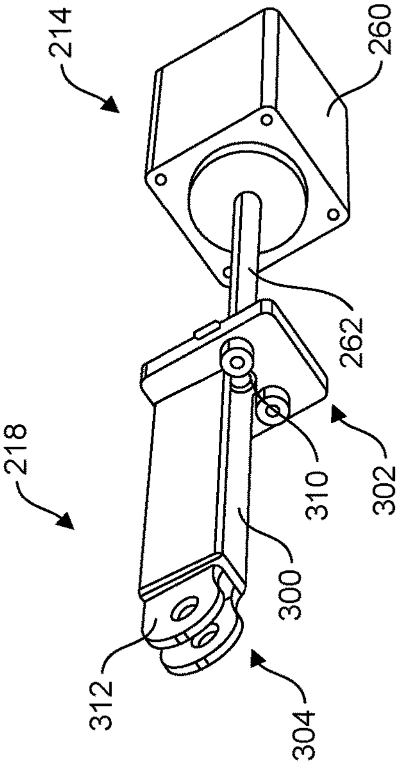

FIG. 18 shows the lock motor 214 (and the drive piston 218) from a first, top-oriented isometric view and FIG. 19 shows the lock motor 214 from a second, bottom-oriented isometric view. As shown, the lock motor 214 includes a motor body 260 and a lock drive shaft 262 having threads (not shown). The lock motor 214 is operable to rotate the lock drive shaft 262. The lock motor 214 (e.g., the motor body 260) has a powered state and an unpowered state. In various embodiments, in the unpowered state, the lock motor 214 spins freely (e.g., the lock drive shaft 262) and in the powered state the lock motor 214 rotates the lock drive shaft 262 in a first direction or a second direction. In some examples, the lock motor 214 is a stepper motor, such as a linear stepper motor. The lock motor 214 may be configured to be driven off a sinusoidal waveform. As previously referenced, use of a sinusoidal waveform with a stepper motor may result in lowered operating noise. For example, the lock motor 214 may be characterized by an operating noise of 20 decibels or less. For reference, the operating noise according to embodiments disclosed herein was measured for the entire fenestration system during opening and closing and was recorded as being approximately 20 decibels. Therefore, the operating noise of the motor alone would clearly be 20 decibels or less in the fenestration unit 10. As shown, the lock motor 214 may be received within the motor housing 250 of the slide mount 212 (e.g., as shown in FIG. 15, 17 or 18) such that the lock motor 214 is fixedly secured within the motor housing 250 of the slide mount 212.

Figure 20:
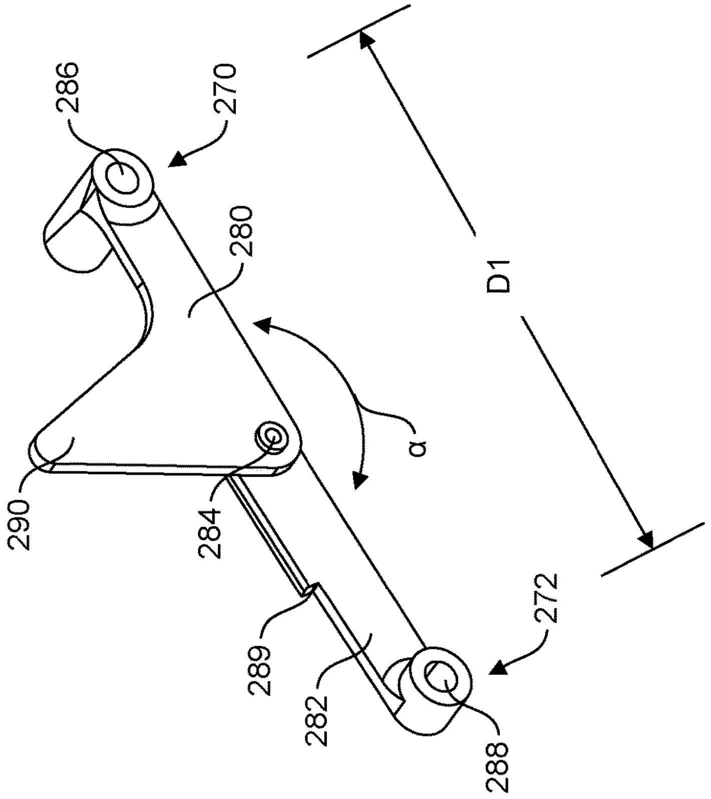

FIG. 20 shows the release linkage 216 isolated from a remainder of the fenestration unit 10. The release linkage 216 is transitionable between an extended state (e.g., as shown in FIGS. 20 and 30) and a collapsed state (e.g., as shown in FIG. 31). The release linkage 216 is configured to be pivotably coupled to the slide mount 212 at the slide pivot feature 256 (FIG. 17), as well as the fixed mount 210 at the fixed pivot feature 242 (FIG. 16). For reference, the release linkage 216 is anchored, or secured to a first frame member (e.g., the sill 36 as shown) of the frame 22 through connection to the fixed mount 210. As shown, the release linkage 216 has a first end 270, and a second end 272, and includes a first link 280 and a second link 282 pivotably coupled at a pivot connection 284 located intermediate the first end 270 and the second end 272 of the release linkage 216.

The first and second links 280, 282 define a first, extended angle $\alpha$ at which the first and second ends 270, 272 are spaced apart at a first spacing D1 and a second, collapsed angle at which the first and second ends 270, 272 are spaced apart at a second spacing that is less than the first spacing D1. In some examples, the first, extended angle is greater than 90 degrees, is an obtuse angle, is approximately 180 degrees, or is greater than 180 degrees. In some examples, the second, collapsed angle is 90 degrees or less, 45 degrees or less, approximately 0 degrees, or less than 0 degrees.

The first end 270 is defined by the first link 280, the first link 280 having a first pivot aperture 286 at the first end 270 for connection to the fixed pivot feature 242 of the fixed mount 210. The second end 272 is defined by the second link 282, the second link 282 having a second pivot aperture 288 at the second end 272 for connection to the slide pivot feature 256. The first link 280 further defines a transverse projection 290 (a substantially triangular projection, as shown) toward the pivot connection 284 between the first and second links 280, 282. The transverse projection 290 is configured to pass through the slot 244 in the fixed mount 210 (FIG. 16). In some embodiments, a torsion spring (not shown) is assembled around the second end 272 of the link 282 with one portion of the spring (e.g., one spring leg) in received in recess 289 of the link 280 (FIG. 20) and another portion of the spring (an opposite, second spring leg) nested onto the shelf 258 on the slide receptacle 252 (FIG. 17) such that the release linkage 216 is biased toward the extended state.

As shown in FIGS. 18 and 19, the drive piston 218 has a body 300 with a first end 302 and a second end 304, and a drive nut 306 coupled to the first end 302 of the body 300. The drive piston 218 includes an aperture 310 at the first end 302 through which the lock drive shaft 262 may pass. As shown, the body 300 optionally has room or space for receiving the lock drive shaft 262 as it extends through the aperture 310. The second end 304 of the body 300 includes a pivot connector 312 for pivotably coupling the drive piston 218 to the link member 220.

Figure 21:
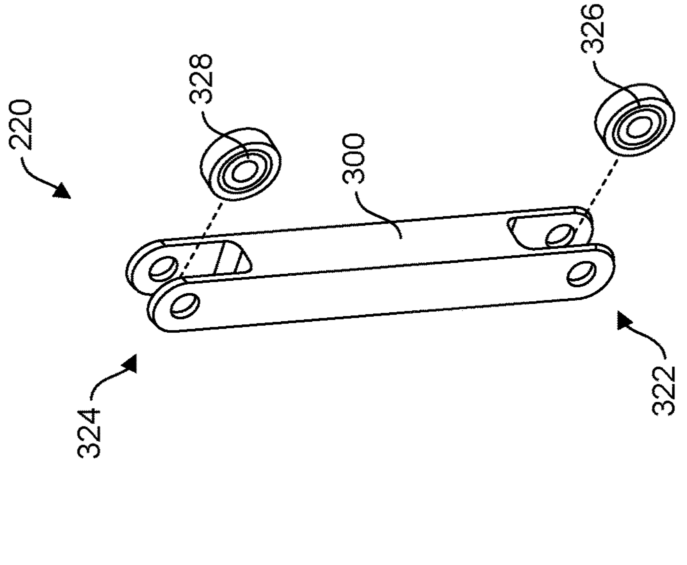

FIG. 21 shows the link member 220, which is configured to be pivotably coupled to the drive piston 218. The link member 220 has a body 320 having a first end 322 and a second end 324. The link member also has a first roller bearing 326 and a second roller bearing 328. Each of the first and second ends 322, 324 have a pocket adapted to receive the first roller bearing 326 and the second roller bearing 328, respectively. The first and second roller bearings 326, 328 are configured to bear against the frame 22 (the second jamb 34 and the sill 36) during movement of the link member 220. The first end 322 is configured to be pivotably connected to the second end 304 of the drive piston 218 at the pivot connector 312. The second end 324 is configured to be pivotably connected to the connection member 222. In some examples, the link member 220 is configured to be deflected, or pivoted, from a first position (e.g., a vertical position extending along the second jamb 34) relative to the frame 22 to an angled position (e.g., extending angularly between the sill 36 and the second jamb 34). In some examples, the angled position defines an angle of from 15 degrees to 75 degrees between two frame members (e.g., the second jamb 34 and the sill 36). In some examples, the angled position defines an angle of approximately 45 degrees between the two frame members (e.g., the second jamb 34 and the sill 36).

The angling of the link member 220, and the associated action of the drive piston 218 and connection member 222, results in a high mechanical advantage, acting as a corner toggle mechanism. This mechanical advantage approaches infinity as the link member 220 and the connection member 222 approach axial alignment (e.g., vertical alignment) at the end of the link member 200 stroke, or travel. This high mechanical advantage is particularly useful when the sash 24 is being drawn closed by the lock system 202 to ensure sealing to the frame 22 (e.g., by compressing weather sealing coupled to the sash 24 and/or the frame 22).

Figure 22:
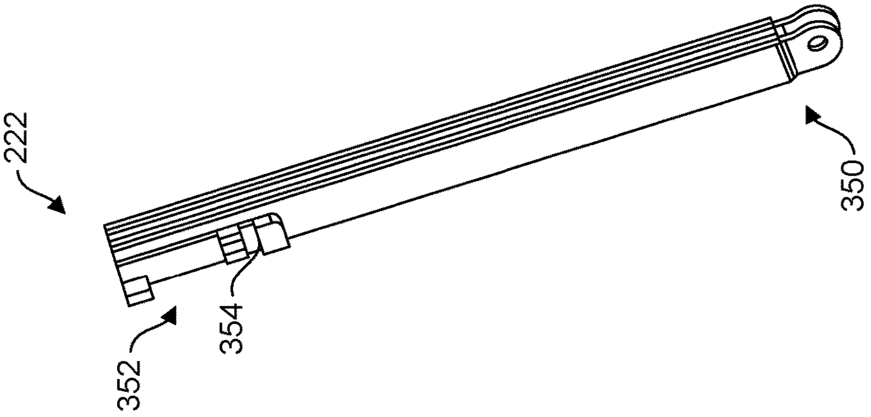

FIG. 22 shows the connection member 222 from an isometric view. As shown, the connection member 222 has a first end 350 and a second end 352. The first end 350 has a pivot mating feature configured to be pivotably coupled to the second end 324 of the link member 220. The second end 352 is configured to be coupled to the lock system 202, including a keyed mating feature 354.

As shown in FIG. 15, the lock system 202 includes a lock bar 370, a first latch assembly 372, a second latch assembly 374, and a biasing assembly 376. The lock bar 370 is slidably coupled to the first and second latch assemblies 372, 374 and the biasing assembly 376. Sliding of the lock bar 370 within the first and second latch assemblies 372, 374 causes the latch assemblies to actuate between locking and unlocked positions. The biasing assembly 376 is configured to press against the lock bar 370 to bias the lock bar 370 toward a retracted position, corresponding to unlocked positions for the first and second latch assemblies 372, 374.

Figure 23:
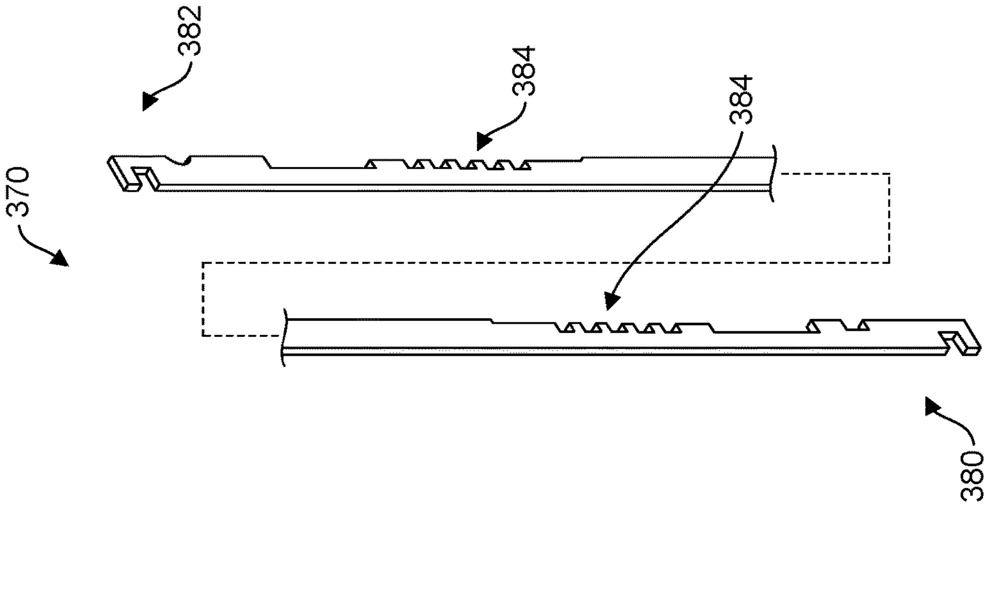

FIG. 23 shows the lock bar 370 from an isometric view (the lock bar 370 is shown broken into two pieces with a middle length removed due to its length). As shown, the lock bar 370 includes a first end 380 and a second end 382. The first end 380 is keyed to secure to the second end 352 of the connection member 222 at the keyed mating feature 354 and the second end 382 is keyed to secure to the biasing assembly 376. The lock bar 370 also includes two sets of notches 384 for coupling the lock bar 370 to the first and second latch assemblies 372, 374.

As shown in FIG. 15, the first and second latch assemblies 372, 374 include first and second latch members 390, 392, respectively, configured to engage with the latch features 38 located on the sash 24 (FIG. 5). The latch assemblies 372, 374 are configured such that, upon sliding of the lock bar 370, the latch members 390, 392 are actuated between locked and unlocked positions.

As shown in FIG. 15, the biasing assembly 376 includes a base 400, a cap 402, and a biasing member 404 secured between the base 400 and the cap 402. The cap 402 is configured to be secured to the frame 22 (e.g., the second jamb 34) with the biasing member 404 (e.g., a spring) interposed between the base 400 and the cap 402. The base 400 is coupled to the second end 382 of the lock bar 370 such that the biasing member 404 imposes a biasing force on the second end 382 of the lock bar 370 toward the first end 380 of the lock bar 370. This biasing force, in turn, biases the lock system 202 generally, and the first and second latch assemblies 372, 374, more specifically, toward the unlocked, or unlatched position or state.

Figure 26:
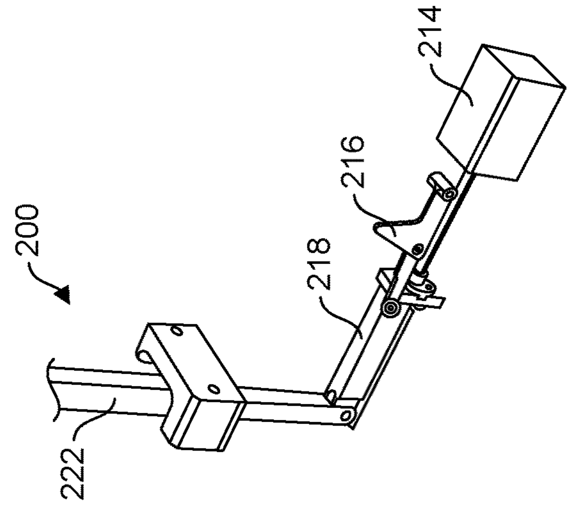

As shown in FIG. 14, the lock system 202 is operably coupled to the actuation system 200 such that actuation of the actuation system 200 causes operation of the lock assembly 202 between a locked state and an unlocked state. As seen in FIG. 26, which is an isometric view of a portion of the lock assembly 202, the drive piston 218 is operably coupled to the lock motor 214 such that actuation of the lock motor 214 causes linear translation of the drive piston 218 relative to the lock motor 214 between an extended and retracted position.

Figure 24:
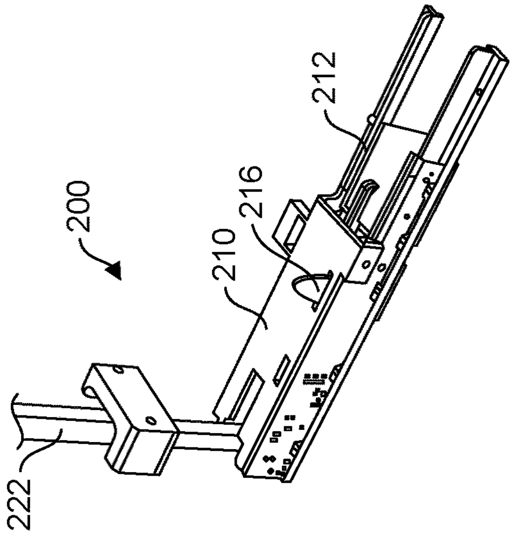
Figure 25:
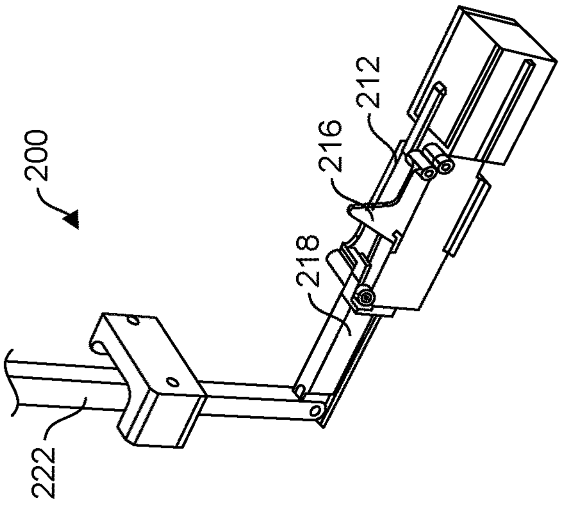

FIGS. 24 to 26 show a portion of the actuation system 200 as assembled. FIG. 24 shows the full assembly, FIG. 25 shows the fixed mount 210 removed from view, and FIG. 26 shows the slide mount 212 further removed from view. In each of the views, the overall assembly is in the same operative state. As shown, the release linkage 216 is in the extended state (when the release linkage 216 is in the extended state the slide mount 212 is positioned in an active position). As will be subsequently described, when the release linkage 216 is in the collapsed state (FIG. 31), the slide mount 212 is positioned in an inactive position and the lock assembly 202 is automatically transitioned to the unlocked state. As shown, the drive piston 218 is in the extended position, with the drive piston 218 extending away from the slide mount 212.

Figure 28A:
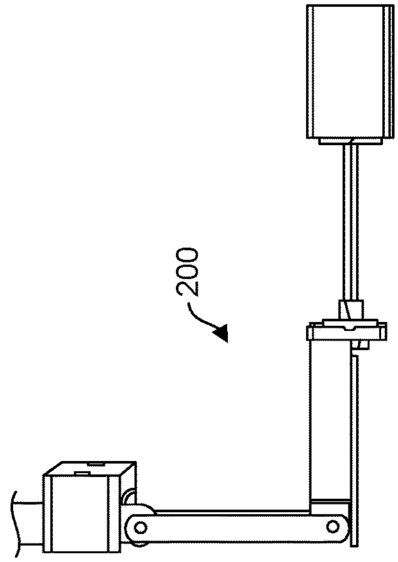
Figure 27:
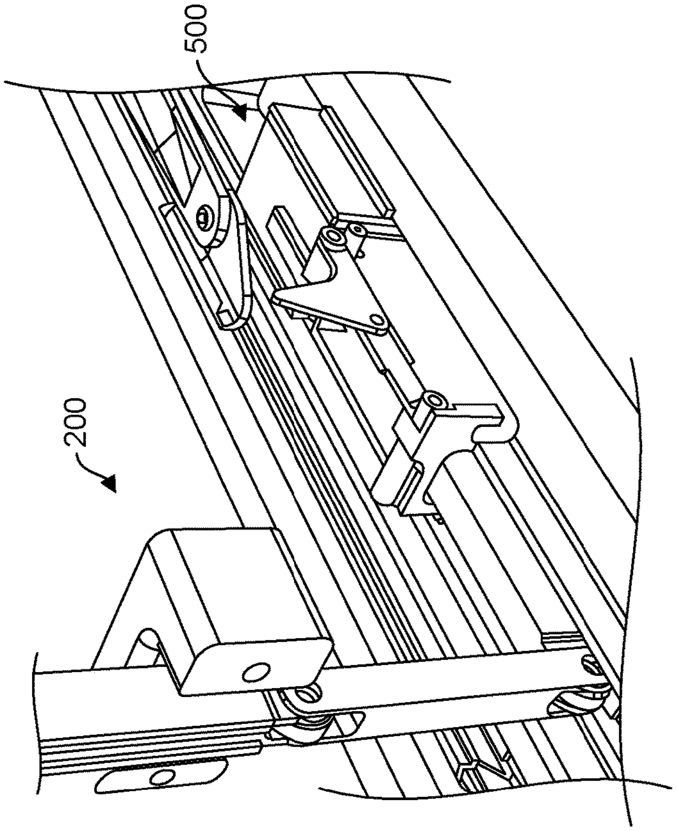

As shown, the link member 220 defines a shallow angle (e.g., about zero degrees) with the frame 22 (e.g., with the second jamb 34). And, as shown, the connection member 222 is in the locked position. This, in turn, means the lock assembly 202 would be in the locked state as the lock bar 370 (connected to the connection member 222) would also be in the extended position, overcoming the biasing force of the biasing assembly 376. FIGS. 27 and 28A show additional views of the actuation system 200 in the same position as FIGS. 24 to 26 for visualization purposes, where FIG. 27 shows the actuation system 200 with the second jamb 34 removed and the fixed mount 210 removed and FIG. 28A shows the actuation system 200 from a side view with the frame 22 removed and the fixed and slide mounts 210, 212 removed.

The powered lock system 28 is operable between locked and unlocked states, as well as operable to a manual override, also referred to as a released state. Specifically, actuation of the actuation system 200, and specifically the lock motor 214, causes operation of the lock assembly 202 between locked and unlocked states and actuation of the release linkage 216 transitions the lock assembly 202 between active (either active, locked or active, unlocked) and released, unlocked states or to the manual override. During transition from the locked state shown in FIGS. 14, 15, and 24 to 28 to the unlocked state, the lock motor 214 is placed in the powered state and operated to rotate the lock drive shaft 262. The drive nut 306 of the drive piston 218 is threaded onto the lock drive shaft 262. Rotation of the lock drive shaft 262 in a first direction causes the drive nut 306 to be pulled up the lock drive shaft 262 (and rotation in a second, opposite direction causes the drive nut 306 to be pushed down the lock drive shaft 262 in an opposite direction). As the drive nut 306 is pulled up the lock drive shaft 262 the attached drive piston 218 is pulled into the slide receptacle 252 of the slide mount 212.

As the drive piston 218 is pulled into the slide receptacle 252 the link member 220, and specifically the first end 322 of the body 320, is pulled toward the slide receptacle 252 and translated along the frame 22 (e.g., laterally along the sill 36). At the same time the second end 324 of the body 320 is translated along the frame 22 (e.g., down the second jamb 34), resulting in the link member 220 extending angularly between two frame members of the frame 22 (e.g., between the second jamb 34 and the sill 36). During such translation, the first and second roller bearings 326, 328 help the link member 220 slide along the frame 22.

Figure 28B:
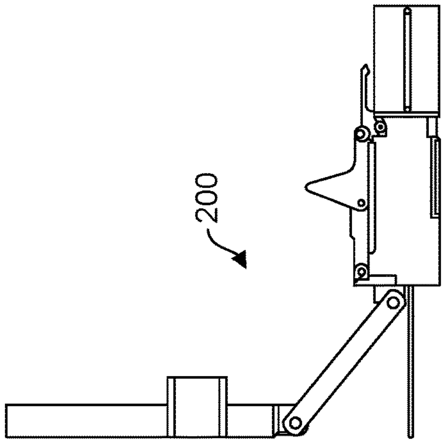

As the second end 324 slides along the frame (e.g., the second jamb 34) the connection member 222 is drawn along the frame 22, actuating the lock assembly 202 to the unlocked state, unlocking the sash 24 from the frame 22. By reversing the aforementioned process, the lock assembly 202 may be transitioned to the locked state, locking the sash 24 to the frame 22. FIG. 28B shows a portion of the actuation system 200 in the unlocked state for reference purposes (with the slide mount 212 in place).

Figure 29:
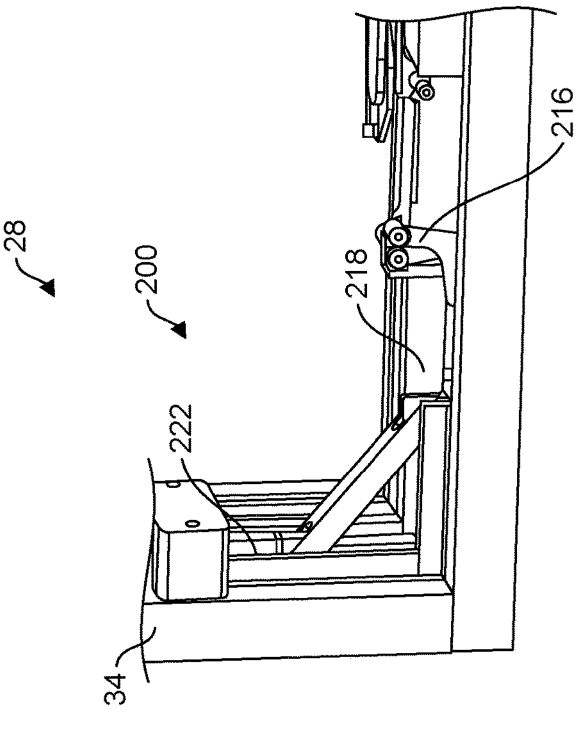

As previously referenced, the powered lock system 28 is operable between locked and unlocked states, as well as operable to a manual override, also referred to as a released state. FIG. 29 shows a portion of the powered lock system 28 at the actuation system 200 in the manual override, or released state with the fixed mount 210 removed for visualization of the underlying components. As shown, the release linkage 216 is depressed (e.g., overcoming the bias of the release linkage 216 to the extended state to transition the release linkage 216 to the collapsed state. In some examples, the release linkage in the extended state is tented, hyperextended, or otherwise rotated beyond a neutral, or zero angle, and once the release linkage is depressed beyond the neutral, or zero angle the bias in the biasing assembly 376 (FIG. 15) of the lock system 202 overcomes the bias of the release linkage 216 to the extended position and the release linkage 216 then collapses. As seen in other figures, in some examples, prior to depressing the release linkage 216 the transverse projection 290 (FIG. 20) is exposed to a user through the slot 244 in the fixed mount 210 (FIG. 16).

FIG. 30 is a side view of the actuation system prior to collapse of the release linkage 216 and FIG. 31 is a side view afterward. In each of those figures, the fixed mount 210 is removed from view for visualization of the underlying components. For reference, prior to depression, the fixed mount 210 optionally acts as a stop, or set point against which the release linkage 216 is biased in the (hyper) extended state prior to being depressed and collapsed. A user (not shown) can press on the release linkage 216 using the transverse projection 290 to press the release linkage 216 past the neutral position, at which point the biasing assembly 376 of the lock system 202 overcomes the natural resistance of the release linkage 216 against collapse and the first and second links 280, 282 are transitioned from the first, extended angle $\alpha$ (FIG. 20) at which the first and second ends 270, 272 are spaced apart at the first spacing D1 (FIG.

20) to the second, collapsed angle (FIG. 31) at which the first and second ends 270, 272 are spaced apart at a second spacing (FIG. 31) that is less than the first spacing D1.

As the slide mount 212 is pivotably connected to the release linkage 216, upon collapsing the release linkage 216, the slide mount 212 slides along the frame 22 (e.g., along the sill 36 away from the second jamb 34) in the direction indicated causing the drive piston 308 to be pulled back with the slide mount 212 along the frame 22 (e.g., laterally along the sill 36). As can be seen in the figures, the frame 22 (e.g., the sill 36) may have a space or pocket 500 for permitting such sliding retraction.

At the same time the second end 324 of the link member 220 is translated along the frame 22 (e.g., down the second jamb 34), resulting in the link member 220 extending angularly between two frame members of the frame 22 (e.g., between the second jamb 34 and the sill 36). Again, during such translation, the first and second roller bearings 326, 328 (FIG. 21) help the link member 220 slide along the frame 22. And, again, as the second end 324 slides along the frame (e.g., the second jamb 34) the connection member 222 is drawn along the frame 22, actuating the lock assembly 202 to the unlocked state, unlocking the sash 24 from the frame 22.

By reversing the aforementioned process, the lock assembly 202 may be transitioned from the manual override or released state to the active state. Reversal of the process may be accomplished by positively driving the actuation assembly toward the lock state, or otherwise driving the drive nut 306 so that it is pulled up the lock drive shaft 262 driving the slide mount 212 back toward a reset position and the release linkage toward the extended position.

The manual override process is particularly useful during a loss of power when there is a need to release the lock assembly 202 (e.g., for emergency egress). In some embodiments, the fenestration unit 10, and specifically the sash 24, can be pushed open in the case of a power loss as the operator motor 102 is able to spin freely in an unpowered state.

Control System

Figure 33:
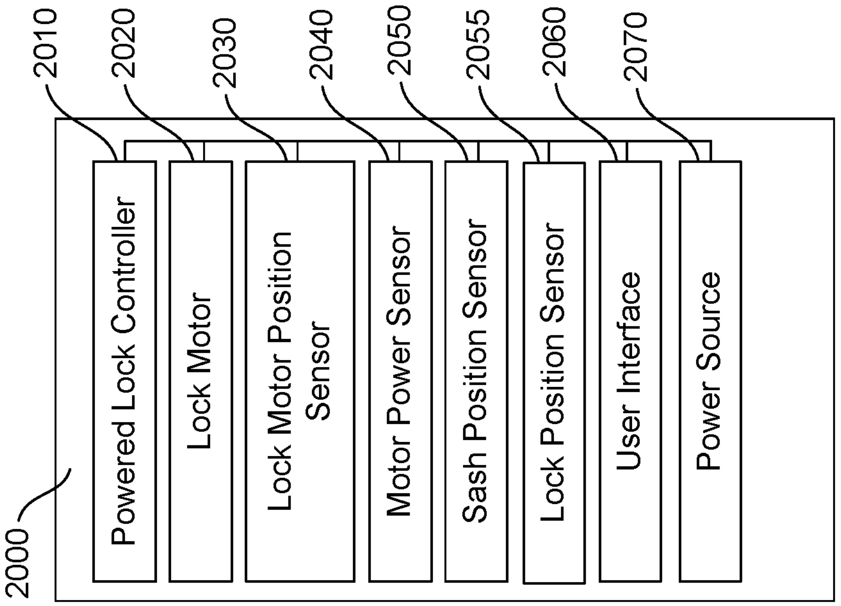
FIGS. 32 and 33 are system level schematics of powered operator and lock systems, according to some embodiments.
Figure 32:
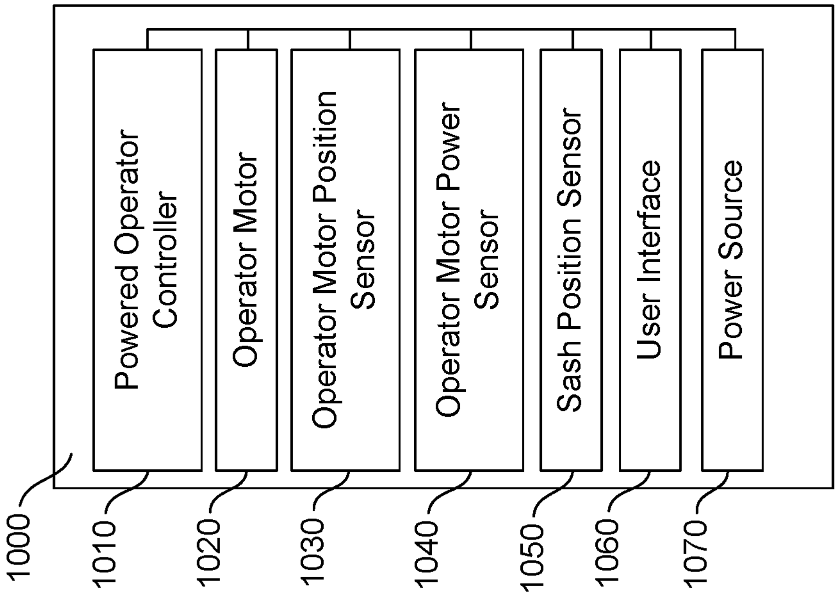

FIGS. 32 and 33 are a schematic representation of a powered operator control system 1000 and a powered lock control system 2000 for use with the fenestration unit 10.

In some embodiments, the powered operator control system 1000 includes a powered operator controller 1010, an operator motor 1020 (such as the operator motor 102), an operator motor position sensor 1030 (such as the position sensor 108), an operator motor power sensor 1040, a sash position sensor 1050, a user interface 1060, and a power source 1070, for example.

The controller 1010 is configured to control operation of the system 1000. In various examples, the controller 1010 may include one or more microprocessors and other features for controlling operation of the system 1000.

The controller 1010 may include, or be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more central processing units (CPUs), software, hardware, firmware, or any combination of these and/or other components. The controller 1010 may include a processing unit configured to communicate with memory to execute computer-executable instructions stored in the memory. Additionally, or alternatively, the controller 1010 may be configured to store information (e.g., sensed data) in the memory and/or access information (e.g., sensed data) from the memory.

In some embodiments, the memory includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. The memory may be part of the controller (e.g., configured as a microcontroller) with internal FLASH/FRAM or EEPROM. In embodiments, the memory stores computer-executable instructions for causing the processor to implement aspects of embodiments of system components discussed herein and/or to perform aspects of embodiments of methods and procedures discussed herein.

The computer-executable instructions may include, for example, computer code, digital signal processing, machine-useable instructions, and the like such as, for example, program components capable of being executed by one or more processors associated with the computing device. Program components may be programmed using any number of different programming environments, including various languages, development kits, frameworks, and/or the like. Program components may be programmed, or reprogrammed remotely/wirelessly, or over-the-air, or may be programmed, or reprogrammed via a wired connection. Some or all of the functionality contemplated herein may also, or alternatively, be implemented in hardware and/or firmware.

The operator motor 1020 may be operatively coupled to the controller 1010 such that operation, or actuation, of the operator motor 1020 between powered and unpowered states is managed by the controller 1010. The controller 1010 may include programming or otherwise be configured to drive, or power, the operator motor 1020 off a sinusoidal waveform. And/or, the operator motor 1020 may include componentry or other features to cause such operation.

The operator motor position sensor 1030 (such as the position sensor 108), is operatively coupled to the controller 1010 (e.g., directly or indirectly through some other component, such as the operator motor 1020 itself) to assist with operation of the operator motor 1020. In some examples, the position sensor 1030 detects an angular position of the operator motor 1020 (e.g., a Hall sensor, such as a magnetic 3D Hall-effect sensor or a reflective sensor) and conveys such information to the controller 1010. In some examples, the position sensor 1030 is utilized by the controller to determine a state, or position, of the sash 24 (e.g., open, closed, or degree or angle of openness). In some examples, the position sensor 1030 may be utilized in a safety override protocol. For example, if the controller 1010 places the motor in the powered state, and actuates the motor between open or closed states, but no movement is sensed using the position sensor 1030, the controller 1010 may power off the motor to avoid injury or damage. And, when placed in an open, or partially open state, the controller 1010 may be operative to "hold" or prevent inadvertent sash movement (e.g., from wind or other external force). In such instances, the position sensor 1030 may be utilized to provide continuous or intermittent position feedback and the controller 1010 may operate or power the operator motor 1020 to maintain the desired sash position.

The operator motor power sensor 1040 may measure motor current, for example. In such instances, the motor power sensor 1040 may provide information relating to power use, motor torque, or other similar information that may be utilized in controlling operation of the operator motor 1020. For example, such information may be utilized as a second, or a primary safety sensor to detect impediments or other issues with operation of the operator motor 1020. For example, if a threshold current, threshold maximum change in current over time, drop below a threshold voltage, or other electrical measurement is sensed, the controller 1010 may cause the operator motor 1020 to go to an inoperative or power off state.

The sash position sensor 1050 may include one or more microswitches or other sensors configured to determine or confirm that the sash 24 is in a closed or open configuration. For example, the sash position sensor may be sash position sensor 64. In some examples, the sash position sensor 1050 may additionally or alternatively be mounted on the second jamb 34 such that when the sash 24 is closed, the sash position sensor 1050 is tripped and the controller 1010 receives feedback that the sash 24 is in the closed position. And, when the sash position sensor 1050 is not tripped, the controller 1010 receives feedback that the sash 24 is not in the closed position. In some examples, the sash position sensor 1050 additionally or alternatively includes a sensor (e.g., microswitch) positioned on the first jamb 32 that is tripped when the sash 24 is in the fully open position, providing such feedback to the controller 1010 (and when not tripped, providing the feedback to the controller 1010 that the sash is not in the fully open position). Regardless of the particular form, the sash position information may be used in combination with the motor position sensor 1030 in one or more calibration operations (e.g., to determine the operating limits for motor position), or to augment or replace safety functionality provided by the motor position sensor 1030.

The user interface 1060 may include a display (e.g., an LED display) for conveying system status information to a user (e.g., sash open, sash closed, sash opened X %, sash being held in position, and other information). In some examples, the user interface 1060 is configured to receive input from a user and/or display information to a user relating to user preferences or window performance or configuration information, such as window size, favorite position, encryption key, model number, or other information. The user interface may also include an input mechanism, such as a capacitive sensing input (e.g., based on capacitive coupling that takes the capacitance produced by the human body as the input). The input mechanism (e.g., capacitive sensing input) may include a slide interface, where a user slides his or her finger to a desired degree of window openness along a graphic interface and the controller 1010 receives the input and operates the operator motor 1020 accordingly.

The power source 1070 may provide electrical power to the operative components of the controller 1010 and/or the other components of the system 1000, and may be any type of power source suitable for providing the desired performance and/or longevity requirements of the controller 1010 and/or system 1000. In various embodiments, the power source 1070 may include one or more batteries, which may be rechargeable (e.g., using an external energy source, such as an inductive charger), or any other DC or AC power input, for example.

As shown, the powered lock control system 2000 includes a powered lock controller 2010, a lock motor 2020 (such as the lock motor 214), a lock motor position sensor 2030, a lock motor power sensor 2040, a sash position sensor 2050, a lock position sensor 2055, a user interface 2060, and a power source 2070, for example.

The controller 2010 is configured to control operation of the system 2000. In various examples, the controller 2010 may include one or more microprocessors and other features for controlling operation of the system 2000. The controller 2010 may be implemented in the same or different manner than the controller 1010. In fact, the controller 2010 may be the same as the controller 1010, with the controller 1010 providing the supplemental functionality described below.

The lock motor 2020 (such as the lock motor 214) may be operatively coupled to the controller 2010 such that operation, or actuation, of the lock motor 2020 between powered and unpowered states is managed by the controller 2010. The controller 2010 may include programming or otherwise be configured to drive, or power, the lock motor 2020 off a sinusoidal waveform, for example. And/or, the lock motor 2020 may include componentry or other features to cause such operation.

The lock motor position sensor 2030 (which may be similar to the position sensor 108 of the operator motor), is operatively coupled to the controller 2010 (e.g., directly or indirectly through some other component, such as the lock motor 2020 itself) to assist with operation of the lock motor 2020. In some examples, the position sensor 2030 detects an angular position of the lock motor 2020 (e.g., Hall sensor or reflective sensor, such as a magnetic 3D Hall-effect sensor) and conveys such information to the controller 2010. In some examples, the position sensor 2030 is utilized by the controller 2010 to determine a state, or position, of the lock assembly of the fenestration unit 10 (e.g., locked vs. unlocked vs. released/overridden). In some examples, the position sensor 2030 may be utilized in a safety override protocol. For example, if the controller 2010 places the motor in the powered state, and actuates the motor between open or closed states, but no movement is sensed using the position sensor 2030, the controller 2010 may power off the motor to avoid injury or damage.

The motor power sensor 2040 may measure motor current, for example. In such instances, the motor power sensor 2040 may provide information relating to power use, motor torque, or other similar information that may be utilized in controlling operation of the lock motor 2020. For example, such information may be utilized as a second, or a primary safety sensor to detect impediments or other issues with operation of the lock motor 2020. For example, if a threshold current, or threshold maximum change in current over time is sensed, the controller 2010 may cause the lock motor 2020 to go to an inoperative or power off state.

The sash position sensor 2050 may be substantially similar to (or may actually be the same as) the sash position sensor 1050. Such sash position information may be used in combination with the motor position sensor 2030 in one or more operations to ensure that the lock assembly is not placed in the locked state when the sash 24 is not in the closed position, for example.

The user interface 2060 may include a display (e.g., an LED display) for conveying system status information to a user (e.g., unlocked, locked, lock overridden, etc.). The user interface may also include an input mechanism, such as a capacitive sensing input (e.g., based on capacitive coupling that takes the capacitance produced by the human body as the input). The input mechanism (e.g., capacitive sensing input) may include an interface for receiving input to switch the lock assembly between the locked and unlocked states and to operate the lock motor 2020 accordingly. The user interface 2060 may be substantially similar, or may be the same as, the user interface 1060.

The power source 2070 may be similar to, or the same as the power source 1070. The power source 2070 may provide electrical power to the operative components of the controller 2010 and/or the other components of the system 2000 and may be any type of power source suitable for providing the desired performance and/or longevity requirements of the controller 2010 and/or system 2000. In various embodiments, the power source 2070 may include one or more batteries, which may be rechargeable (e.g., using an external energy source), or any other DC or AC power input, for example.

The powered operator control system 1000 and the powered lock control system 2000 of the fenestration unit 10 may be part of an overall control system 3000. A schematic representation of the control system 3000, according to some embodiments, is provided in FIG. 34. In general terms, the control system 3000 includes one or more microcontrollers that control operation of peripheral devices (e.g., motors, sensors, user interfaces, and the like) and receives user input through a user interface and/or remote communication module for controlling sash position, and locked and unlocked states of the fenestration unit 10, for example.

As shown in FIG. 34, the control system 3000 optionally includes a main board (MB) containing a microcontroller, external FLASH of FRAM memory for remote software updating, an environmental sensor, a linear regulator, ESD protection diodes and connectors for peripheral devices and a user interface, and other components as appropriate.

The user interface optionally includes a capacitive electrode connected to the main board (MB) microcontroller and a liquid crystal display (LCD). A radio control board (RCB) may be used for communication with the control system 3000. The RCB may include an external radio module or a serial interface or IrDA may be used for communication with the control system 3000. In some solutions, an external radio module or a serial interface may be used. In this case, the LCD can be omitted or/and a single LED can be used if desired for display purposes.

The capacitive electrode may be in the form of printed circuit board with appropriate tracks connected to the main board (MB) microcontroller at two or more points. The capacitive electrode optionally includes a capacitive slider (CS) and a capacitive button (CB) and, in some solutions, may include multiple buttons or/and sliders. The mainboard (MB) microcontroller is configured to measure the capacitance between the two or more points and uses the measured values to determine the position of the finger along the sensor. The position can then be converted to a percentage in the range of 0 to 100%, for example, and used as an input for controlling sash position. The sash position and/or selected input (e.g., between 0% and 100% open or closed), can also be displayed on the LCD display.

In some embodiments, as shown in FIG. 34 two independent motors may be used to control the fenestration unit 10, one lock motor (LM) for performing the locking function (e.g., the lock motor 214) and one vent motor (VM) for the venting function (e.g., operator motor 102). Generally, motor drivers are used to provide sufficient current to the motors, and encoders are used for tracking motor. As shown, there is a vent motor driver (VMD), vent motor encoder (VME), lock motor driver (LMD) and lock motor encoder (LME). Each motor driver may be supplied from power distribution circuit (PDC), and controlled from the main board (MB) microprocessor, for example. Additionally, or alternatively, for tracking position of the motor(s), a Hall sensor or optical reflective encoder, for example, may be used. The lock motor encoder (LME) and vent motor encoder (VME) are optionally connected directly to main board (MB), and may be powered from the main board (MB) only when the motors LM, VM are moving. In some implementations, the encoders (VME, LME) provide information about the speed of the motors (LM, VM) in the form of pulses with a frequency dependent on the speed of the motors. In some solutions, when the motors (LM or VM) are configured as stepper motor, the associated encoder may be omitted.

In order to control the maximum open angle of the sash or maximum venting position and the minimum angle, or position of the sash or minimum venting position, limit switches may be used, including lock limit switches (LLS) and vent limit switches (VLS). The limit switches may be built in the form of infrared barriers, reflective barriers, or mechanical switches as desired. In the IR barrier switch example, an emitter diode sends a light beam which is normally received by the receiver diode. Movement of a mechanical part (e.g., the sash or lock catch) covers the emitter diode when it achieves a position to be detected, such that the receiver diode is blocked from receiving light, and the position is detected. Reflective limit switches work in a similar manner, the difference being that output signal is inverted.

For controlling the sash position, an angularity sensor may be used, such as the sash position sensor 64. The angularity sensor can be built as a rotating magnet that changes rotational position according to the angular position of the sash. The magnetic flux from the magnet can be measured by 3D analog Hall sensor, and then converted to an angular value by comparation to lookup table, for example. In some cases, the sensor may be configured as a pair of two printed circuit boards overlapping each other, according to sash angle. The circuit boards can measure capacitance values which are dependent on the overlapping position of the two boards.

In some embodiments, the control system 3000 is configured to receive commands, and potentially communicate return information to, an external wireless (e.g., radio) control module. In some examples, the transmission medium is 2.4 GHz bandwidth—Bluetooth Low Energy, or Bluetooth Classic. The main board (MB) may be coupled to a radio control board (RCB) to remotely control and/or to setup parameters for particular the controller 3000 such as maximum open angle, favorite position, open/close speed, and other user preferences. The radio control board (RCB) may be used for direct control from a smart phone, bridge or other device as desired.

The control system 3000 may be hardwired to a power supply or/and include a battery pack (BP) with an optional charging circuit. In some embodiments such a charging circuit can include a solar panel or/and inductive charging circuit.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

What is claimed is:

1. A powered operator system for a fenestration unit, the powered operator system comprising:

an operator motor assembly having an output pulley oriented in a first direction;

an operator assembly having an input pulley oriented in a second direction that is substantially perpendicular to the first direction; and a drive belt forming a continuous loop extending between the output pulley and the input pulley to operably couple the operator motor assembly to the operator assembly, the drive belt defining a twisted configuration between the output pulley and the input pulley.

2. The system of claim 1, wherein the fenestration unit has a plurality of frame members including a first frame member, and further wherein the output pulley and the input pulley are both positioned proximate the first frame member.

3. The system of claim 1, wherein the fenestration unit has a plurality of frame members including a first frame member and a second frame member coupled to the first frame member, and further wherein the operator assembly is located on the first frame member and the operator motor assembly is located on the second frame member.

4. The system of claim 1, wherein the fenestration unit includes a sill and a jamb coupled to the sill, and further wherein the operator motor assembly is located on the jamb and the operator assembly is located on the sill.

5. The system of claim 1, wherein the operator assembly includes an input belt guide associated with the input pulley, the input belt guide including a top guide, a bottom guide, and an arcuate flange surrounding at least a portion of the drive belt to substantially inhibit slippage of the drive belt on the input pulley.

6. The system of claim 1, wherein the operator assembly includes an output belt guide associated with the output pulley, the output belt guide including a top guide, a bottom guide, and an arcuate flange surrounding at least a portion of the drive belt to substantially inhibit belt slippage on the output pulley.

7. The system of claim 1, wherein the drive belt is formed of a flexible material that forms the continuous loop, and further wherein the drive belt is twisted through an angle of about 90 degrees.

8. A powered operator system for a fenestration unit, the powered operator system comprising:

an operator motor having an output pulley oriented in a first direction and an output pulley coupled to the output pulley;

an operator assembly having an input pulley oriented in a second direction that is substantially perpendicular to the first direction and an input pulley coupled to the input pulley;

a drive belt extending between the output pulley and the input pulley to operably couple the operator motor to the operator assembly;

an output belt guide associated with the output pulley, the output belt guide including a first output guide member, a second output guide member, and an arcuate output guide surface surrounding at least a portion of the drive belt to substantially inhibit belt slippage on the output pulley; and an input belt guide associated with the input pulley, the input belt guide including a first input guide member, a second input guide member, and an arcuate input guide surface surrounding at least a portion of the drive belt to substantially inhibit slippage of the drive belt on the input pulley;

wherein the output belt guide includes an output guide frame portion that is configured to be mounted with the output pulley within the output guide frame portion and the output pulley being rotatable within the output belt guide.

9. The system of claim 8, wherein the first output belt guide member and the second output belt guide member each include output guide belt-engaging surfaces, the first and second output belt guide members extending from the output guide frame portion at spaced apart locations and in a parallel direction, wherein the first and second output belt guide members are configured to engage outer surfaces of the drive belt to retain the drive belt on the output pulley during operation of powered operator system.

10. The system of claim 9, wherein, the first and second output guide belt-engaging surfaces of the first and second output belt guide members are generally parallel to one another.

11. The system of claim 10, wherein the output guide belt-engaging surfaces of the first and second output belt guide members are spaced from one another by a distance at least as great as a distance between the outer surfaces of the drive belt.

12. The system of claim 8, wherein the fenestration unit has a plurality of frame members including a first frame member, and further wherein the output pulley and the input pulley are both positioned proximate the first frame member.

13. The system of claim 8, wherein the fenestration unit has a plurality of frame members including a first frame member and a second frame member coupled to the first frame member, and further wherein the operator assembly is located on the first frame member and the operator motor is located on the second frame member.

14. The system of claim 8, where the fenestration unit includes a sill and a jamb coupled to the sill, and further wherein the operator motor is located on the jamb and the operator assembly is located on the sill.

15. The system of claim 8, wherein the drive belt is formed of a flexible material that forms a continuous loop.

16. The system of claim 8, wherein the drive belt is twisted through an angle of about 90 degrees between the input pulley and the output pulley.

17. A powered operator system for a fenestration unit, the powered operator system comprising:

an operator motor having an output pulley oriented in a first direction and an output pulley coupled to the output pulley;

an operator assembly having an input pulley oriented in a second direction that is substantially perpendicular to the first direction and an input pulley coupled to the input pulley;

a drive belt extending between the output pulley and the input pulley to operably couple the operator motor to the operator assembly;

an output belt guide associated with the output pulley, the output belt guide including a first output guide member, a second output guide member, and an arcuate output guide surface surrounding at least a portion of the drive belt to substantially inhibit belt slippage on the output pulley; and an input belt guide associated with the input pulley, the input belt guide including a first input guide member, a second input guide member, and an arcuate input guide surface surrounding at least a portion of the drive belt to substantially inhibit slippage of the drive belt on the input pulley;

wherein the drive belt is formed of a flexible material that forms a continuous loop.

18. The system of claim 1, wherein the drive belt comprises a plurality of teeth extending substantially continuously along a length of the continuous loop.

* * * * *